US011078121B2

United States Patent
Backhaus-Ricoult et al.

(10) Patent No.: US 11,078,121 B2
(45) Date of Patent: Aug. 3, 2021

(54) HIGH CORDIERITE-TO-MULLITE RATIO CORDIERITE-MULLITE-ALUMINUM MAGNESIUM TITANATE COMPOSITIONS AND CERAMIC ARTICLES COMPRISING SAME

(71) Applicant: Corning Incorporated, Corning, NY (US)

(72) Inventors: Monika Backhaus-Ricoult, Bourron (FR); Patrick David Tepesch, Corning, NY (US); Bryan Ray Wheaton, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 641 days.

(21) Appl. No.: 15/834,839

(22) Filed: Dec. 7, 2017

(65) Prior Publication Data

US 2018/0111880 A1    Apr. 26, 2018

Related U.S. Application Data

(62) Division of application No. 14/478,200, filed on Sep. 5, 2014, now Pat. No. 9,868,670.
(Continued)

(51) Int. Cl.
*C04B 35/101* (2006.01)
*C04B 35/64* (2006.01)
(Continued)

(52) U.S. Cl.
CPC ...... *C04B 35/1015* (2013.01); *B01D 39/2068* (2013.01); *C04B 35/478* (2013.01);
(Continued)

(58) Field of Classification Search
CPC ... C04B 35/1015; C04B 35/478; C04B 35/64; C04B 38/0006; C04B 2111/00793; C04B 2235/3206; C04B 2235/3208; C04B 2235/3213; C04B 2235/3218; C04B 2235/3224; C04B 2235/3225; C04B 2235/3232; C04B 2235/3418;
(Continued)

(56) References Cited

U.S. PATENT DOCUMENTS

| 4,329,162 A | 5/1982 | Pitcher, Jr. |
| 8,394,167 B2 | 3/2013 | Merkel et al. |

(Continued)

FOREIGN PATENT DOCUMENTS

| CN | 1156412 C | 7/2004 |
| CN | 101479213 A | 7/2009 |

(Continued)

OTHER PUBLICATIONS

International Search Report and Written Opinion PCT/US2014/056707 dated May 7, 2015.
(Continued)

*Primary Examiner* — Robert Clemente
(74) *Attorney, Agent, or Firm* — Kurt R. Denniston

(57) ABSTRACT

Disclosed are ceramic bodies comprised of composite cordierite-mullite-aluminum magnesium titanate (CMAT) ceramic compositions having high cordierite-to-mullite ratio and methods for the manufacture of same.

6 Claims, 9 Drawing Sheets

Related U.S. Application Data

(60) Provisional application No. 61/881,108, filed on Sep. 23, 2013.

(51) Int. Cl.

| | | |
|---|---|---|
| F01N 3/08 | (2006.01) | |
| B01D 39/20 | (2006.01) | |
| C04B 35/478 | (2006.01) | |
| C04B 38/00 | (2006.01) | |
| C04B 111/00 | (2006.01) | |

(52) U.S. Cl.
CPC .......... C04B 35/64 (2013.01); C04B 38/0006 (2013.01); F01N 3/08 (2013.01); C04B 2111/0081 (2013.01); C04B 2111/00793 (2013.01); C04B 2235/3206 (2013.01); C04B 2235/3208 (2013.01); C04B 2235/3213 (2013.01); C04B 2235/3218 (2013.01); C04B 2235/3224 (2013.01); C04B 2235/3225 (2013.01); C04B 2235/3227 (2013.01); C04B 2235/3229 (2013.01); C04B 2235/3232 (2013.01); C04B 2235/3418 (2013.01); C04B 2235/3445 (2013.01); C04B 2235/3463 (2013.01); C04B 2235/3481 (2013.01); C04B 2235/5436 (2013.01); C04B 2235/5463 (2013.01); C04B 2235/786 (2013.01); C04B 2235/80 (2013.01); C04B 2235/9607 (2013.01)

(58) Field of Classification Search
CPC .... C04B 2235/3445; C04B 2235/3463; C04B 2235/3481; C04B 2235/5436; C04B 2235/5463; C04B 2235/786; C04B 2235/80; C04B 2235/9607; B01D 39/2068; F01N 3/08
See application file for complete search history.

(56) References Cited

U.S. PATENT DOCUMENTS

| | | | |
|---|---|---|---|
| 8,450,227 B2 | 5/2013 | McCauley et al. | |
| 2009/0137382 A1 | 5/2009 | Merkel | |
| 2010/0237007 A1* | 9/2010 | Merkel | C04B 35/465 210/510.1 |
| 2010/0304082 A1 | 12/2010 | Merkel | |
| 2012/0177875 A1 | 7/2012 | Beall et al. | |
| 2012/0299227 A1 | 11/2012 | Chou et al. | |
| 2013/0111862 A1 | 5/2013 | Divens-Dutcher et al. | |
| 2014/0150389 A1 | 6/2014 | Divens-Dutcher et al. | |
| 2014/0230694 A1* | 8/2014 | Klamklang | C04B 35/62222 106/286.4 |
| 2014/0357473 A1* | 12/2014 | Bischof | B01J 29/763 502/64 |
| 2014/0357474 A1* | 12/2014 | Boger | B01J 29/763 502/67 |
| 2014/0357476 A1* | 12/2014 | Bischof | B01J 29/763 502/75 |
| 2014/0371062 A1 | 12/2014 | Merkel | |
| 2016/0068441 A1* | 3/2016 | Backhaus-Ricoult | C04B 38/0074 55/523 |
| 2016/0229750 A1* | 8/2016 | Divens-Dutcher | B01J 23/02 |
| 2016/0347665 A1* | 12/2016 | Divens-Dutcher | C04B 38/0006 |

FOREIGN PATENT DOCUMENTS

| | | |
|---|---|---|
| CN | 102199040 B | 3/2013 |
| JP | 6040766 A | 2/1994 |
| JP | 2009-542566 A | 12/2009 |
| KR | 199407224 B1 | 8/1994 |
| WO | 2008005249 A2 | 1/2008 |
| WO | 2012166222 A1 | 12/2012 |
| WO | 2014028207 A1 | 2/2014 |
| WO | 2014085320 A1 | 6/2014 |

OTHER PUBLICATIONS

MEMS & Nanotechnology Exchange, https://www.memsnet.org/material/mullite3al2o32sio2bulk/, Jun. 23, 2012.

Hudson Institute of Mineralogy/mindat.org, http://www.mindat.org/min-1128.html, Mar. 27, 2013.

* cited by examiner

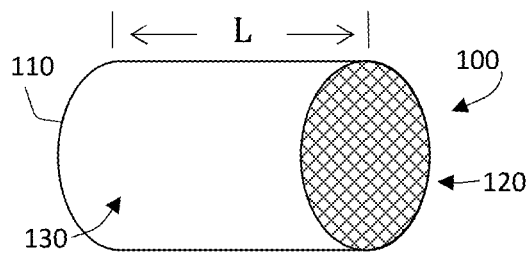
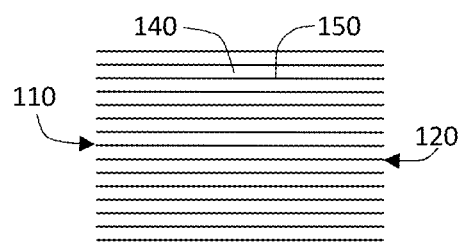
FIG. 1A
FIG. 1B
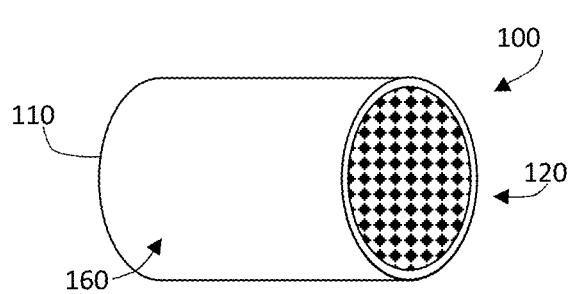
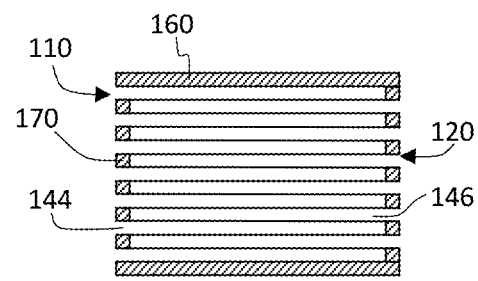
FIG. 1C
FIG. 1D
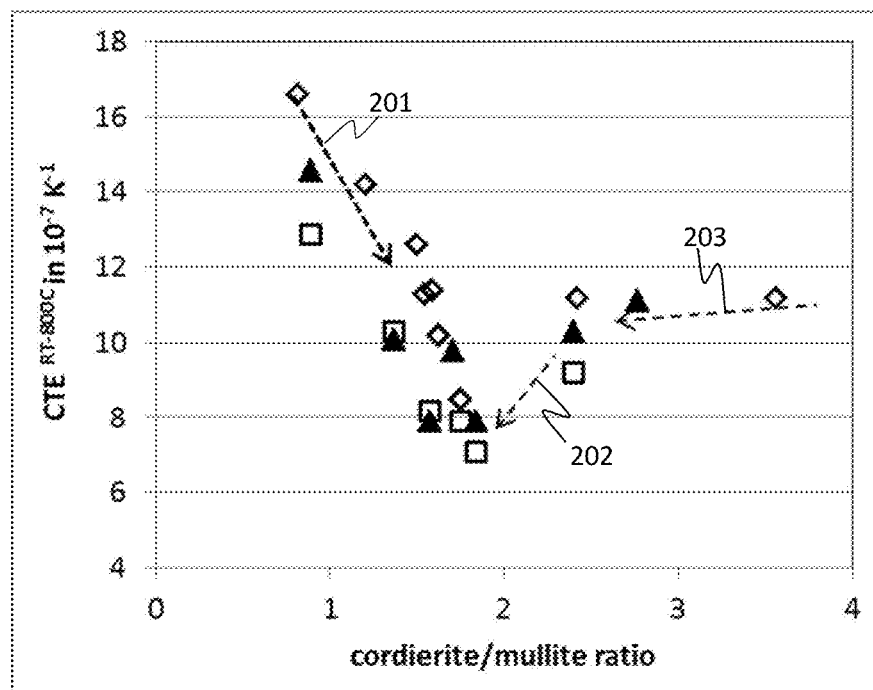
FIG. 2

HIGH CORDIERITE-TO-MULLITE RATIO CORDIERITE-MULLITE-ALUMINUM MAGNESIUM TITANATE COMPOSITIONS AND CERAMIC ARTICLES COMPRISING SAME

This is a divisional application of U.S. patent application Ser. No. 14/478,200 filed on Sep. 5, 2014, which claims the benefit of priority to U.S. Provisional Application Ser. No. 61/881,108 filed on Sep. 23, 2013, the contents of each are relied upon and incorporated herein by reference in their entireties.

FIELD

Exemplary embodiments of the present disclosure relate to ceramic compositions and to composite ceramic compositions comprising aluminum magnesium titanate, cordierite, and mullite having a high cordierite to mullite ratio.

BACKGROUND

Discussion of the Background

Cordierite and aluminum titanate-based honeycombs have been widely used for a variety of applications, such as catalytic substrates and filters for diesel and gasoline particulate emission. Recently, filter material families have been extended to include cordierite-mullite-aluminum titanate composite materials (CMAT), which, due to their phase assembly and microstructure, exhibit a strength advantage compared to aluminum titanate-feldspar composites and a volumetric heat capacity advantage compared to cordierite.

Diesel particulate filters (DPF) and gasoline particulate filters (GPF) can be obtained from a honeycomb porous ceramic by plugging neighboring channels in a checkerboard pattern on both ends to form a filter with inlet and outlet channels. The exhaust gas has to then flow through the wall of the honeycomb. During its path through the porous honeycomb wall, small particulates from the exhaust gas are deposited on the pore surface or on the soot layer at the wall surface, thus providing filtering of the exhaust gas. The forming soot cake is periodically burned in a regeneration cycle so that the DPF/GPF has a lifetime similar to that of the vehicle. Alternative filter designs can also be used, such as radial trough filters or radial disk filters, which compared to the honeycomb design with its long, narrow gas flow channels have wider gas flow channels and/or a stronger radial component for the gas flow, but share the same particulate filtering of the gas when it passes through the thin porous ceramic wall and offer the same opportunity for incorporation of a suitable catalyst in the wall-porosity and/or on the walls.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide composite ceramic compositions comprising high cordierite-to-mullite ratio cordierite-mullite-pseudobrookite.

Exemplary embodiments of the present disclosure also provide a diesel particulate filter comprised of a composite composition of high cordierite-to-mullite ratio cordierite-mullite-aluminum magnesium titanate.

Exemplary embodiments of the present disclosure also provide a method for manufacturing a composite cordierite aluminum magnesium titanate ceramic article.

Additional features of the disclosure will be set forth in the description which follows, and in part will be apparent from the description, or may be learned by practice of the disclosed exemplary embodiments.

An exemplary embodiment discloses a ceramic article including a pseudobrookite phase, a second phase, and a third phase. The pseudobrookite phase includes predominately alumina, magnesia, and titania. The second phase includes cordierite, the third phase includes mullite, and the cordierite-to-mullite phase ratio of the ceramic article is greater than or equal to 0.9 and less than or equal to 7.

An exemplary embodiment also discloses a ceramic article having a first crystalline phase predominantly of a solid solution of aluminum titanate and magnesium dititanate, a second crystalline phase of cordierite, and a third crystalline phase of mullite. The ceramic article has a composition, as expressed in weight percent on an oxide basis of from 4 to 10% MgO, from 40 to 55% $Al_2O_3$, from 25 to 44% $TiO_2$, from 5 to 25% $SiO_2$, a sintering aid, and a cordierite-to-mullite phase ratio greater than or equal to 0.9 and less than or equal to 7.

An exemplary embodiment also discloses a method of manufacturing a ceramic article including providing an inorganic batch composition comprising a magnesia source, a silica source, an alumina source, a titania source, and at least one sintering aid. The method includes mixing the inorganic batch composition together with one or more processing aids selected from the group consisting of a plasticizer, lubricant, binder, pore former, and solvent, to form a plasticized ceramic precursor batch composition. The plasticized ceramic precursor batch composition is shaped into a green body. The green body is fired under conditions effective to convert the green body into a ceramic article having a pseudobrookite phase comprising predominately alumina, magnesia, and titania, a second phase comprising cordierite, a third phase comprising mullite, and a cordierite-to-mullite phase ratio of the ceramic article greater than or equal to 0.9 and less than or equal to 7.

It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate exemplary embodiments, and together with the description serve to explain the principles of the disclosure.

FIG. 1A depicts a front face and outer periphery surface of a ceramic honeycomb structure. FIG. 1B is a cross section of the ceramic honeycomb structure of FIG. 1A. FIG. 1C depicts the ceramic honeycomb structure of FIG. 1A having a skin and channel plugs, and FIG. 1D is a cross-sectional view of the ceramic honeycomb structure of FIG. 1C.

FIG. 2 is a graphical plot of data from Examples according to exemplary embodiments of the present disclosure showing coefficient of thermal expansion (CTE) from room temperature (25° C.) to 800° C. ($10^{-7}$ $K^{-1}$) as a function of cordierite/mullite ratio for different firings of materials with silica and magnesia batch content variation.

DETAILED DESCRIPTION OF THE ILLUSTRATED EMBODIMENTS

Figure 3:
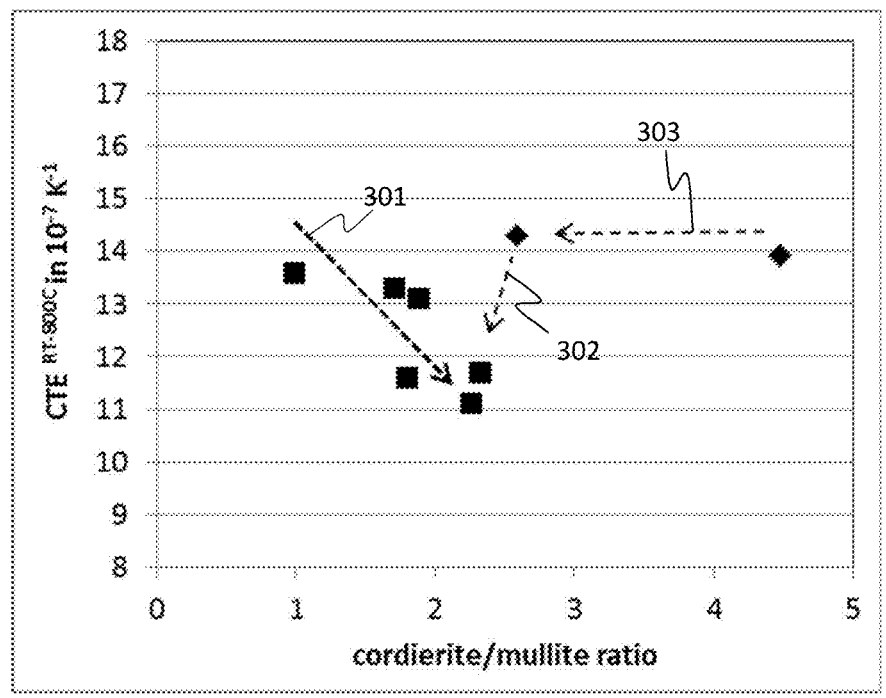
FIG. 3 is a graphical plot of data from Examples according to exemplary embodiments of the present disclosure showing CTE from room temperature to 800° C. ($10^{-7}$ $K^{-1}$) as a function of cordierite/mullite ratio for different firings of materials batched for different cordierite/mullite fractions.

The disclosure is described more fully hereinafter with reference to the accompanying drawings, in which exemplary embodiments are shown. The disclosure may, however, be embodied in many different forms and should not be construed as limited to the embodiments set forth herein. Rather, these embodiments are provided so that this disclosure is thorough, and will fully convey the scope to those skilled in the art. In the drawings, the size and relative sizes of layers and regions may be exaggerated for clarity. Like reference numerals in the drawings may denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

To meet emission regulations for light and heavy duty vehicles, filter materials may be highly porous to allow gas flow through walls without restricting engine power, while exhibiting high filtration efficiency for emitted particles, withstand corroding exhaust environment, and bear severe thermal shock during rapid heating and cooling. Regulation of $CO_2$ emission and higher fuel efficiency demand drive miniaturization and integrated functionality in the exhaust gas after-treatment system. Therefore, it is desirable to reduce the number of components in the after-treatment system, decrease component size and implement multi-functionality. A step in this direction is the integration of de-NOx and DOC catalysts into diesel particulate filters. High NOx filtration efficiency can be achieved by high catalyst loading and high catalyst activity at low temperature. Fe- and Cu-zeolites, as well as Cu-chabazites and others may be used as suitable catalysts. Washcoat loadings of 100 g/l are currently common practice; future loadings may exceed 150 g/l. In order to promote high catalyst loading and preserve low backpressure, filter substrate according to exemplary embodiments has very high porosity and large pore size, around 60% porosity with median pore size of 18 micrometers or larger. For high material porosity and large pore size, it may become a challenge to preserve good filter efficiency and thermo-mechanical robustness.

Cordierite and aluminum titanate both are low thermal expansion materials and therefore suited for applications where high thermal shock resistance is required. Both materials show anisotropy in their thermal expansion with different crystallographic directions exhibiting positive and negative expansion. Due to the anisotropy in thermal expansion, mismatch strains build up between grains with different crystallographic orientation; such strains can lead to microcracking. Polycrystalline cordierite or aluminum titanate ceramics undergo extensive microcracking during thermal cycling. Microcracks open during cooling and close, sometimes even heal during heating. This creates a hysteresis response to thermal cycling with differences between heating and cooling that can be attributed to the reversible microcrack formation and closure. As a result of microcracking, the overall thermal expansion of the ceramics is lowered compared to the average crystallographic coefficient of thermal expansion (CTE). At the same time, material strength can be decreased by microcracks. In cordierite, differences in crystallographic thermal expansion require large grain (domain) sizes to reach the stress threshold for microcracking, so that microcrack densities remain rather low. As a result of the much larger anisotropy in crystallographic expansion, microcrack densities in aluminum titanate-based materials are higher and may limit the ceramic's strength. Compared to cordierite, aluminum titanate composites have a higher volumetric heat capacity that can provide an advantage in resistance to thermal cycling and thermal shock.

Porous cordierite and aluminum titanate-feldspar composite honeycomb ceramic articles exhibit low thermal expansion, high porosity, low Young's modulus and high strength for high-performance automotive catalytic converters and diesel particulate filters. Recently, as disclosed in U.S. Pat. No. 8,394,167 B2, the content of which is hereby incorporated by reference in its entirety as if fully set forth herein, cordierite-mullite-aluminum titanate composite material (CMAT), exhibits a better strength compared to aluminum titanate-feldspar composites and a better volumetric heat capacity compared to cordierite due to the CMAT phase assembly and microstructure. The combination of both advantages makes CMAT materials particularly suited for high porosity filters. In addition, the pseudobrookite phase in these composites is stabilized by magnesium in solid solution so that it is thermodynamically more stable than the aluminum titanate phase encountered in aluminum titanate feldspar composites and better resists thermal decomposition and accelerated decomposition at high temperature when exposed to glass forming elements, such as copper, manganese, cobalt, bismuth, etc. and their compounds.

Exemplary embodiments disclose an aluminum-magnesium titanate pseudobrookite-cordierite-mullite phase mixture in a composition range that provides unexpected and superior performance over other aluminum-magnesium titanate pseudobrookite-cordierite-mullite materials. Materials in this composition range have high cordierite/mullite ratio and excel by lower coefficient of thermal expansion (CTE), higher strength and high isotropy in their thermo-mechanical properties. While not wishing to be bound by any particular theory or explanation, the lower CTE of the aluminum-magnesium titanate pseudobrookite-cordierite-mullite of the present disclosure is due to the lower CTE of cordierite compared to mullite, however, this reason is not the only driver for the material improvement since materials with high cordierite/mullite ratio do not show only lower CTE, but also improved strain tolerance.

Figure 11A:
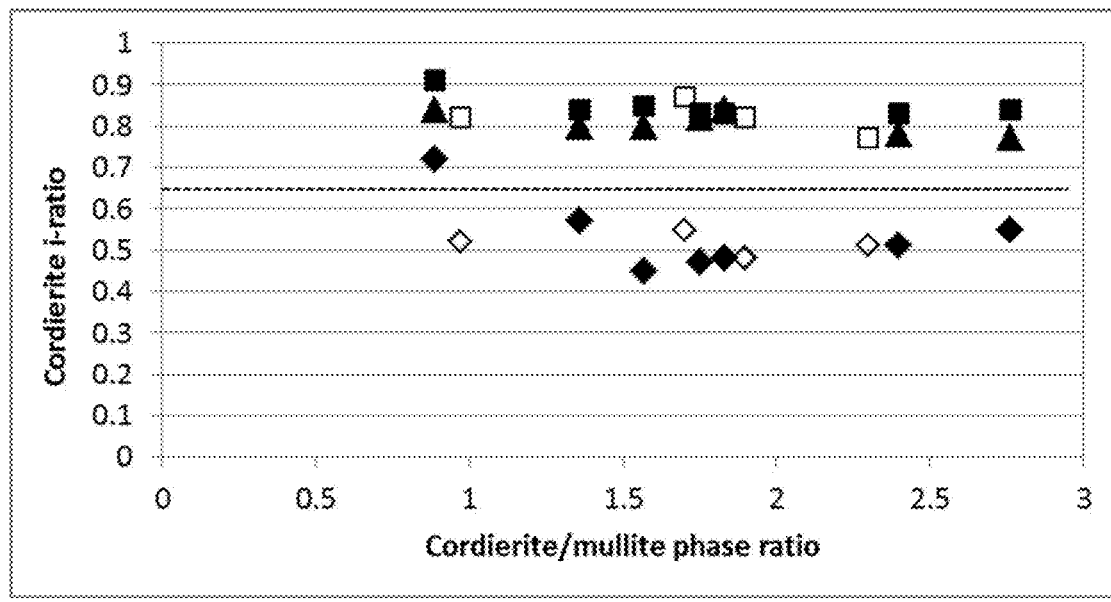
FIG. 11A is a graphical plot of data of cordierite texture factors as a function of cordierite to mullite (cordierite/mullite) phase ratio.
Figure 11B:
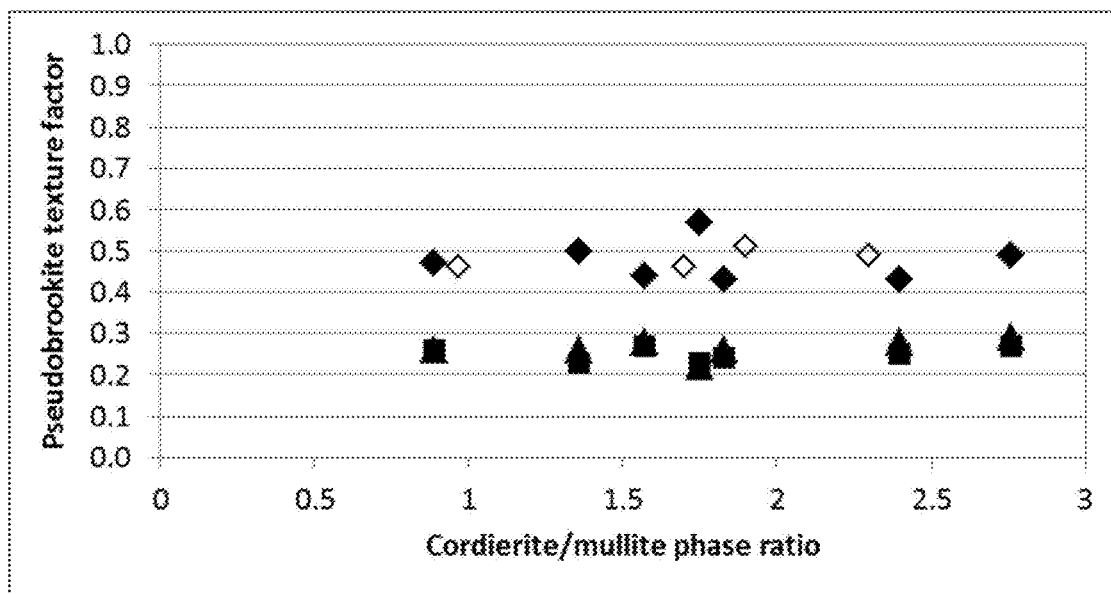
FIG. 11B is a graphical plot of data of pseudobrookite texture factors as a function of cordierite/mullite phase ratio.
Figure 12A:
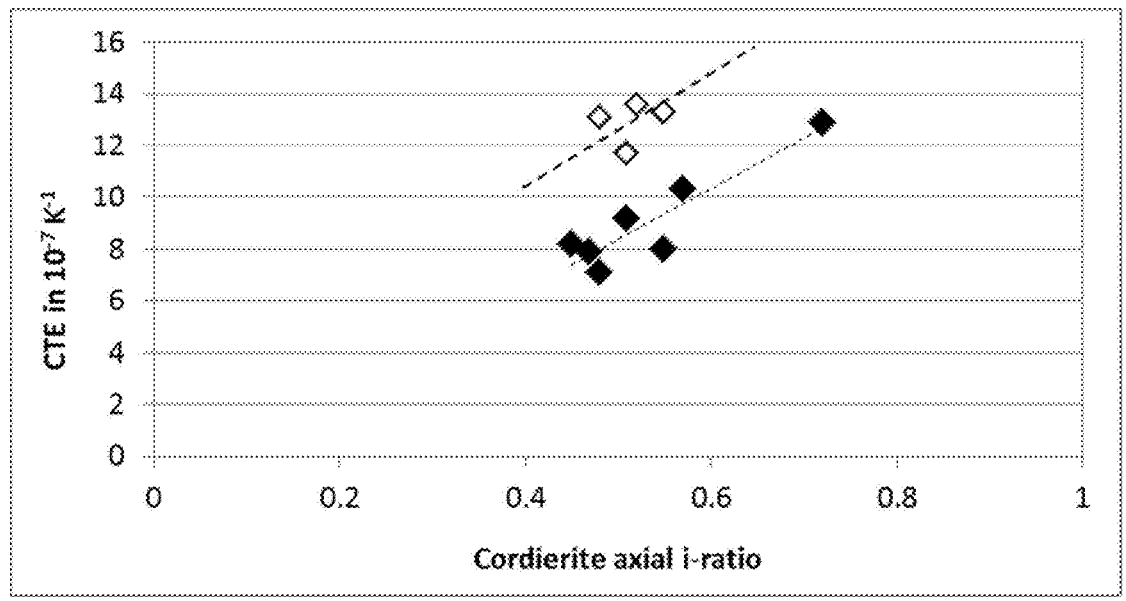
FIG. 12A is a graphical plot of data of the dependency of coefficient of thermal expansion (CTE) on the cordierite texture factor (axial i-ratio).
Figure 12B:
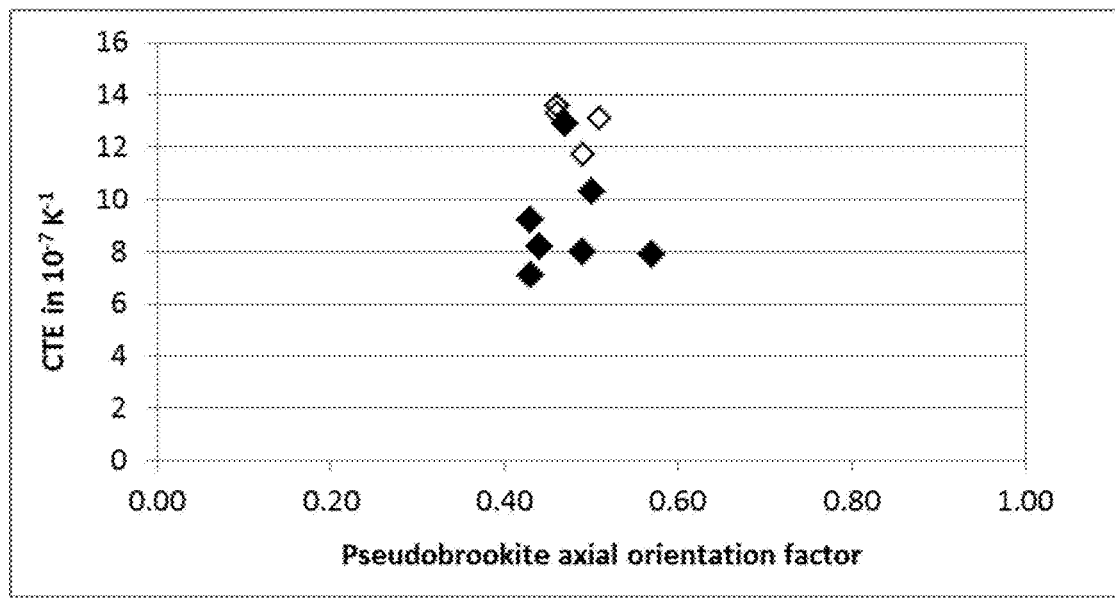
FIG. 12B is a graphical plot of data of the dependency of coefficient of thermal expansion (CTE) on the pseudobrookite texture factors.

Depending on the batch composition, cordierite shows differences in its overall texture (See FIG. 11A). For high cordierite/mullite ratios, the axial cordierite texture coefficient is larger than the random texture coefficient, while for large cordierite/mullite ratios, it is smaller than the random coefficient. Tangential texture coefficients reflect the mirror image information. In FIGS. 11A and 12A, cordierite axial i-ratio (Rietveld) is indicated by solid diamonds, cordierite axial i-ratio (finer alumina) is indicated by open diamonds, cordierite tangential i-ratio (surface, Rietveld) is indicated by solid squares, cordierite tangential i-ratio (finer alumina) is indicated by open squares, cordierite tangential i-ratio (polished, Rietveld) is indicated by solid triangles, and the random powder is indicated by dashed line. The aluminum titanate pseudobrookite phase shows a random overall orientation (FIG. 11B). In FIGS. 11B and 12B, pseudobrookite axial factor (Rietveld) is indicated by solid diamonds, pseudobrookite axial factor (finer alumina) is indicated by open diamonds, pseudobrookite tangential factor (surface, Rietveld) is indicated by solid squares, and pseudobrookite tangential factor (polished, Rietveld) is indicated by solid triangles.

The coefficient of thermal expansion (CTE) of the composite material was found to change linearly with the cordierite global texture factor (See FIG. 12A). For small cordierite axial i-ratio, low CTE was found. CTE increases with increasing axial i-ratio of cordierite. CTE also depends on the choice of the alumina raw material source. Data are shown for two different alumina raw materials; they are shifted in CTE. CTE is independent of the pseudobrookite texture factor (FIG. 12B).

Depending on batch composition and firing cycle, different mechanisms, such as solid and liquid phase reactive sintering processes, can be more or less activated and drive different trends. Thus the range of compositions according to exemplary embodiments of the disclosure with top firing temperatures around 1350° C. and sinter additives that support eutectics promotes materials with lower CTE, higher strength, high filter durability, higher thermal shock resistance and a wider filter operation window.

According to exemplary embodiments it was discovered that CTE of the CMAT material decreases with the cordierite/mullite ratio, goes through a minimum and increases again, while material strength (MOR) and durability (strain tolerance) increase with the same ratio. It was also discovered that the required changes in batch composition resulted in no loss of porosity and enabled slightly larger pore size.

As briefly summarized above, an exemplary embodiment of the present disclosure provides a composite ceramic body comprising a pseudobrookite phase comprising predominately alumina, magnesia, and titania, a second phase comprising cordierite, and a third phase comprising mullite. For example, the ceramic body may be a ceramic article. Further, the cordierite-to-mullite phase ratio of the composite ceramic body can be greater than or equal to 0.9 and less than or equal to 4. The compositions of the ceramic bodies can be characterized as comprising, when expressed on weight percent oxide basis: from 4 to 10% MgO; from 40 to 45% $Al_2O_3$; from 30 to 35% $TiO_2$; from 10 to 20% $SiO_2$, and a sintering aid. In these or other exemplary embodiments, the compositions of the ceramic bodies of the disclosure are expressed in terms of weight fractions of oxide phases comprise, on an oxide basis, a(pseudobrookite, $Al_2TiO_5$+ $MgTi_2O_5$)+b(cordierite, $2MgO.2Al_2O_3.5SiO_2$)+c(mullite, $3+\delta Al_2O_3.2+\chi SiO_2$)+d(X)+e($TiO_2$)+f($Al_2O_3$), wherein X can be at least one of CaO, SrO, $CeO_2$, $Y_2O_3$, $La_2O_3$, and other rare earth oxides and their compounds with other batch constituents, and a, b, c, d, e, and f are weight fractions of each component such that (a+b+c+d+e+f)=1.00. To that end, the weight fraction of each component can be in the respective ranges as follows: $0.3 \leq a \leq 0.75$, $0.02 \leq b \leq 0.5$, $0.005 \leq c \leq 0.3$, $0.0015 \leq d \leq 0.08$, $0.0 \leq e \leq 0.20$, and $0.0 \leq f \leq 0.10$. It will be recognized that the oxide phases of these ceramics will not necessarily be the ideal oxide mixture of those phases, but may form solid solutions with batch oxides or impurities. It will also be recognized that while the sum of a, b, c, d, e, and f is 1.00, it is the ratio of oxides and oxide combinations that are expressed. That is, the composite ceramic body may include other impurities in addition to the ratio of oxides and oxide combinations expressed. This will be apparent in view of the examples disclosed below.

The solid solution aluminum titanate ($Al_2TiO_5$) and magnesium dititanate ($MgTi_2O_5$) phase preferably exhibits a pseudobrookite crystal structure. To that end, the composition of the pseudobrookite phase can depend upon the processing temperature as well as the overall bulk composition of the ceramic and, as such, can be determined by processing thermodynamics and kinetics. However, in an exemplary embodiment, the composition of the pseudobrookite phase comprises from approximately 15% to 35% $MgTi_2O_5$ by weight. Still further, while the total volume of the pseudobrookite phase can also vary, in another exemplary embodiment, the total volume can be in the range of about 50 to about 95 wt % of the overall ceramic composition. For example, the total volume of the pseudobrookite phase can be in a range of about 50 to about 80 wt % of the overall ceramic composition, in a range of about 60 to about 85 wt % of the overall ceramic composition, or even in a range of about 65 to about 70 wt % of the overall ceramic composition.

As mentioned, the cordierite-to-mullite phase ratio of the composite ceramic body can be greater than or equal to 0.9 and less than or equal to 7 according to exemplary embodiments. For example, the ceramic article cordierite-to-mullite phase ratio may be greater than or equal to 1.3 and less than or equal to 2.5. As a further example, the ceramic article cordierite-to-mullite phase ratio may greater than or equal to 1.8 and less than or equal to 2.2.

Optionally, the composite ceramic body can further comprise one or more phases selected from the group consisting of sapphirine, a rutile solid solution (titania-base), corundum, a spinel solid solution ($MgAl_2O_4$—$Mg_2TiO_4$), and glass.

Still further, the ceramic composition can also comprise one or more sintering aid(s) or additives provided to lower the firing temperature and broaden the firing window required to form the ceramic composition. As described in U.S. patent application Ser. No. 13/690,096, the entire contents of which are hereby incorporated by reference as if fully set forth herein, cordierite, mullite, pseudobrookite composites with high porosity and low thermal expansion may have a wide firing window when a sintering aid is added to the batch. A sintering aid can, for example, be present in an amount of from 0.15 to 5 weight percent of the total composition and can include, for example, one or more metal oxides such as CaO, SrO, $CeO_2$, $Y_2O_3$, $La_2O_3$, and other rare earth oxides.

According to an exemplary embodiment of the present disclosure, the ceramic body comprises approximately 10 to 25 wt % cordierite, approximately 5 to 30 wt % mullite, approximately 50 to 70 wt % of a pseudobrookite phase consisting predominantly of an $Al_2TiO_5$—$MgTi_2O_5$ solid solution, approximately 0.15 to 3.0 wt % of a phase including at least one of CaO, SrO, $CeO_2$, $Y_2O_3$, $La_2O_3$, and other rare earth oxides addition and some glass. According to another exemplary embodiment of the present disclosure, the ceramic body comprises approximately 10 to 25 wt % cordierite, approximately 5 to 15 wt % mullite, approximately 50 to 70 wt % of a pseudobrookite phase consisting predominantly of an $Al_2TiO_5$—$MgTi_2O_5$ solid solution, approximately 0.1 to 3.0 wt % of a phase containing at least one of CaO, SrO, $CeO_2$, $Y_2O_3$, $La_2O_3$, and other rare earth oxides addition and some glass.

Exemplary embodiments of the ceramic bodies of the present disclosure can in some instances comprise a relatively high level of total porosity. For example, bodies comprising a total porosity, % P, of at least 40%, at least 45%, at least 50%, or even at least 60%, as determined by mercury porosimetry, can be provided.

In addition to the relatively high total porosities, ceramic bodies of the present disclosure can also comprise a relatively narrow pore size distribution evidenced by a minimized percentage of relatively fine and/or relatively large pore sizes. To this end, relative pore size distributions can be expressed by a pore fraction which, as used herein, is the percent by volume of porosity, as measured by mercury porosimetry, divided by 100. For example, the quantity $d_{50}$ represents the median pore size based upon pore volume, and is measured in micrometers; thus, $d_{50}$ is the pore diameter at which 50% of the open porosity of the ceramic sample has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also expressed in units of micrometers.

The median pore diameter, $d_{50}$, of the pores present in the instant ceramic bodies can, in one embodiment, be at least 10 μm, for example at least 15 μm, or as a further example, at least 16 μm. In another embodiment, the median pore diameter, $d_{50}$, of the pores present in the instant ceramic bodies do not exceed 30 μm, for example do not exceed 25 μm, and as a further example, do not exceed 20 μm. In still another exemplary embodiment, the median pore diameter, $d_{50}$, of the pores present in the instant ceramic bodies can be in the range of from 10 μm to 30 μm, for example, from 15 μm to 25 μm, for example, from 14 μm to 25 μm, and as a further example, from 16 μm to 20 μm. To this end, a combination of the aforementioned porosity values and median pore diameter values can provide low clean and soot-loaded pressure drop while maintaining useful filtration efficiency when the ceramic bodies of the present disclosure are used in diesel exhaust filtration applications.

The relatively narrow pore size distribution of the exemplary embodiments of the ceramic bodies can, in one embodiment, be evidenced by the width of the distribution of pore sizes finer than the median pore size, $d_{50}$, further quantified as pore fraction. As used herein, the width of the distribution of pore sizes finer than the median pore size, $d_{50}$, are represented by a "$d_{factor}$" or "$d_f$" value which expresses the quantity $(d_{50}-d_{10})/d_{50}$. To this end, the ceramic bodies of the present disclosure can comprise a $d_{factor}$ value that does not exceed 0.50, 0.40, 0.35, or even that does not exceed 0.30. In some exemplary embodiments, the $d_{factor}$ value of the disclosed ceramic body does not exceed 0.25 or even 0.20. To this end, a relatively low $d_f$ value indicates a low fraction of fine pores, and low values of $d_f$ can be beneficial for ensuring low soot-loaded pressure drop when the ceramic bodies are utilized in diesel filtration applications.

The relatively narrow pore size distribution of the disclosed ceramic articles can in another exemplary embodiment also be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{breadth}$" or "$d_B$" value which expresses the quantity $(d_{90}-d_{10})/d_{50}$. To this end, the ceramic structure of the present disclosure in one exemplary embodiment comprises a $d_b$ value that is less than 1.50, less than 1.25, less than 1.10, or even less than 1.00. In some exemplary embodiments, the value of $d_b$ is not more than 0.8, more preferably not greater than 0.7, and even more preferably not greater than 0.6. A relatively low value of $d_b$ can provide a relatively higher filtration efficiency and higher strength for diesel filtration applications.

Another exemplary embodiment of the ceramic bodies exhibit a low coefficient of thermal expansion resulting in excellent thermal shock resistance (TSR). As will be appreciated by one of ordinary skill in the art, TSR is inversely proportional to the coefficient of thermal expansion (CTE). That is, a ceramic body with low thermal expansion will typically have higher thermal shock resistance and can survive the wide temperature fluctuations that are encountered in, for example, diesel exhaust filtration applications.

Accordingly, in one exemplary embodiment, the ceramic articles of the present disclosure are characterized by having a relatively low coefficient of thermal expansion (CTE) in at least one direction and as measured by dilatometry, that is less than or equal to about $25.0 \times 10^{-7}/°$ C., less than or equal to $20.0 \times 10^{-7}/°$ C.; less than or equal to $14.0 \times 10^{-7}/°$ C., less than or equal to $11.0\times10^{-7}/°$ C., or even less than or equal to $8.0\times10^{-7}/°$ C., across the temperature range of from 25° C. to 800° C.

Still further, it should be understood that exemplary embodiments can exhibit any desired combination of the aforementioned properties. For example, in one embodiment, it is preferred that the CTE (25-800° C.) does not exceed $14\times10^{-7}/°$ C. (and preferably not more than $11\times10^{-7}/°$ C.), the porosity % P is at least 45%, the median pore diameter is at least 14 μm (and preferably at least 16 μm), and the value of $d_f$ is not more than 0.35 (and preferably not more than 0.30). In another exemplary embodiment, the CTE (25-800° C.) does not exceed $18\times10^{-7}/°$ C. and the porosity % P is at least 40%. For example, the CTE (25-800° C.) does not exceed $20\times10^{-7}/°$ C. and the porosity % P is at least 60%. In another example, CTE (25-800° C.) does not exceed $14\times10^{-7}/°$ C. and the porosity % P is at least 40%. In a further example, CTE (25-800° C.) does not exceed $11\times10^{-7}/°$ C. and the porosity % P is at least 60%.

In another exemplary embodiment, the ceramic bodies may have a median pore size $d_{50}$ in a range of 10 μm to 30 μm; and a strain tolerance=MOR/Emod greater than or equal to 0.11%, wherein MOR is the modulus of rupture in pounds per square inch (psi) at room temperature and Emod is the Young's modulus in psi of the ceramic article at room temperature, wherein the ceramic article comprises a coefficient of thermal expansion, as measured between 25-800° C., of less than or equal to $11\times10^{-7}/K$, wherein the ceramic article comprises a total porosity % P greater than 50% by volume, wherein the cordierite-to-mullite phase ratio is greater than or equal to 1.3 and less than or equal to 2.5.

Now referring to FIGS. 1A and 1B, an exemplary embodiment of a ceramic article such as a honeycomb structure is shown and described in a perspective view and a cross sectional view, respectively. The ceramic honeycomb body 100 has a first end face 110 and a second end face 120, and an outer peripheral wall 130. The ceramic honeycomb body 100 has an array of axially extending channels 140 of length "L" defined by an array of intersecting porous walls 150 extending between the first end face 110 and the second end face 120. The channels 140 may have the same cross sectional open areas as shown in FIGS. 1A and 1B, or may have different cross sectional open areas. The channels 140 may have cross sectional shapes such as circular, elliptical, square, rectangular, triangular, hexagonal, other polygonal, etc., or combinations thereof, and may have rounded corners, square corners or combinations thereof. Further, the intersecting porous walls 150 may be of a substantially constant thickness or may be of various thicknesses. For example, the wall thickness of the intersecting porous walls 150 may be greater near the outer periphery 130 of the ceramic body 100.

As shown in FIGS. 1C and 1D, in a perspective view and a cross sectional view, respectively, the ceramic honeycomb body 100 has a skin layer 160 disposed on the outer peripheral surface 130 according to exemplary embodiments. The channels 140 of the ceramic honeycomb body 100 may be plugged 170 at the first face 110 and the second face 120. The first face 110 may be an inlet end of a wall flow filter having inlet channels 144 plugged 170 at the second face 120. The second face 120 may be an outlet end of the filter having channels 146 plugged 170 at the first face 110. The plugs 170 may be in a checkerboard pattern as shown in FIGS. 1C and 1D or in other patterns. Although not shown, the inlet channels 144 may have a larger cross sectional area than the outlet channels 146. According to exemplary embodiments, the ceramic article may be a diesel or gasoline substrate, filter, or partial filter, and may support a catalyst, such as a washcoat comprising a catalyst.

The ceramic bodies of the present disclosure can have any shape or geometry suitable for a particular application. In high temperature filtration applications, such as diesel particulate filtration, for which the ceramic bodies are especially suited, for example, the bodies may have a multicellular structure, such as that of the honeycomb monolith. For example, in an exemplary embodiment, the ceramic body can comprise a honeycomb structure having an inlet and outlet end or face, and a multiplicity of cells extending from the inlet end to the outlet end, the cells having porous walls as described. The honeycomb structure can further have cellular densities from 70 cells/in² (10.9 cells/cm²) to 400 cells/in² (62 cells/cm²). A portion of the cells at the inlet end or face end can be plugged with a paste having same or similar composition to that of the honeycomb structure, as described in U.S. Pat. No. 4,329,162 which is hereby incorporated by reference as if fully set forth herein. The plugging is only at the ends of the cells which to a depth of about 5 to 20 mm, although this can vary. A portion of the cells on the outlet end but not corresponding to those on the inlet end are plugged. Therefore, each cell is plugged only at one end.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Such filters are "wall flow" filters since the flow paths resulting from alternate channel plugging require the exhaust being treated to flow through the porous ceramic cell walls prior to exiting the filter.

Exemplary embodiments of the ceramic bodies may comprise a strain tolerance=MOR/Emod greater than or equal to 0.11%, wherein MOR is the modulus of rupture in pounds per square inch (psi) at room temperature and Emod is the Young's modulus in psi of the ceramic article at room temperature. For example, the ceramic bodies may have a strain tolerance=MOR/Emod greater than or equal to 0.13%.

According to exemplary embodiments of the disclosure, the cordierite grain size in the ceramic bodies can exceed 2 μm in diameter, for example, diameter of the cordierite grains can be greater than 5 μm, greater than 7 μm, or even greater than 10 μm.

According to exemplary embodiments of the disclosure, the cordierite phase of the ceramic bodies demonstrates a preferred crystallographic texture that can be defined by axial and tangential texture factors. The axial i-ratio $i^{axial}$, and the tangential i-ratio $i^{tangential}$ that are defined as $i=I_{(100)}/[I_{(100)}+I_{(102)}]$. $I_{(ijk)}$, such as $I_{(100)}$ and $I_{(102)}$, are the Rietveld-deconvoluted peak intensities of the indicated diffraction peaks. For the axial i-ratio, X-ray Diffraction (XRD) peak intensities were measured perpendicular to the honeycomb web. For the tangential i-ratio, XRD peak intensities were measured on a honeycomb wall surface or slightly polished honeycomb wall surface. Rietveld deconvolution can be used to extract the cordierite peak intensities from contributions of overlapping peaks of the other phases present. In the exemplary embodiments of the disclosure, the cordierite phase of the ceramic bodies demonstrates axial i-ratios of 0.4-0.75 and tangential i-ratios of 0.75-0.92. Preferred axial i-ratios can be less than 0.6 or even more preferred, less than 0.5.

According to exemplary embodiments of the disclosure, the pseudobrookite phase of the ceramic bodies can comprise crystals not having a substantially preferred crystal orientation or having a small preferred global texture.

According to exemplary embodiments of the disclosure, the pseudobrookite grains of the ceramic bodies can show preferred local crystallographic orientation relationship with adjacent cordierite grains so that the pseudobrookite negative expansion direction is preferentially oriented parallel to the cordierite-pseudobrookite interface plane and less preferentially oriented perpendicular to that interface.

Exemplary embodiments of the present disclosure also provide a method of manufacturing composite cordierite aluminum magnesium titanate ceramic articles from a ceramic forming precursor batch composition comprised of certain inorganic powdered raw materials. Generally, the method first comprises providing an inorganic batch composition comprising a magnesia source, a silica source, an alumina source, and a titania source. The inorganic batch composition is then mixed together with one or more processing aid(s) selected from the group consisting of a plasticizer, lubricant, binder, pore former, and solvent, to form a plasticized ceramic precursor batch composition. The plasticized ceramic precursor batch composition can be shaped or otherwise formed into a green body, optionally dried, and subsequently fired under conditions effective to convert the green body into a ceramic article comprising a pseudobrookite phase comprising predominately alumina, magnesia, and titania, a second phase comprising cordierite, and a third phase comprising mullite, wherein the cordierite-to-mullite phase ratio is greater than or equal to 0.9 and less than or equal to 4. For example, the plasticized ceramic precursor batch composition can be fired under conditions effective to convert the green body into a ceramic article comprising a pseudobrookite phase, a second phase comprising cordierite, and a third phase comprising mullite, wherein the cordierite-to-mullite phase ratio is greater than or equal to 1.3 and less than or equal to 2.5, or further, wherein the cordierite-to-mullite phase ratio is greater than or equal to 1.8 and less than or equal to 2.2.

The magnesia source can, for example and without limitation, be selected from one or more of MgO, $Mg(OH)_2$, $MgCO_3$, $MgAl_2O_4$, $Mg_2SiO_4$, $MgSiO_3$, $MgTiO_3$, $Mg_2TiO_4$, $MgTi_2O_5$, talc, and calcined talc. Alternatively, the magnesia source can be selected from one or more of forsterite, olivine, chlorite, or serpentine. Preferably, the magnesia source has a median particle diameter that does not exceed 35 µm, and preferably that does not exceed 30 µm. To this end, as referred to herein, all particle diameters are measured by a laser diffraction technique such as by a Microtrac particle size analyzer.

The alumina source can, for example and without limitation, be selected from an alumina-forming source such as corundum, $Al(OH)_3$, boehmite, diaspore, a transition alumina such as gamma-alumina or rho-alumina. Alternatively, the alumina source can be a compound of aluminum with another metal oxide such as $MgAl_2O_4$, $Al_2TiO_5$, mullite, kaolin, calcined kaolin, phyrophyllite, kyanite, etc. In one embodiment, the weighted average median particle size of the alumina sources is preferably in the range of from 10 µm to 60 µm, and more preferably in the range of from 15 µm to 30 µm. In still another embodiment, the alumina source can be a combination of one or more alumina forming sources and one or more compounds of aluminum with another metal oxide.

The titania source can, in addition to the compounds with magnesium or alumina described above, be provided as $TiO_2$ powder.

The silica source can be provided as a $SiO_2$ powder such as quartz, cryptocrystalline quartz, fused silica, diatomaceous silica, low-alkali zeolite, or colloidal silica. Additionally, the silica source can also be provided as a compound with magnesium and/or aluminum, including for example, talc, cordierite, chlorite, and the like. In still another embodiment, the median particle diameter of the silica source is preferably at least 5 µm, more preferably at least 10 µm, and still more preferably at least 20 µm.

As described above, one or more sintering aid(s) or additives can optionally be added to the precursor batch composition to lower the firing temperature and broaden the firing window required to form the ceramic composition. The sintering aid can, for example, be present in an amount of from 0.15 to 5 weight percent of the total composition and can include, for example, one or more of a metal oxide such as at least one or more of CaO, SrO, $CeO_2$, $Y_2O_3$, $Fe_2TiO_5$, $La_2O_3$, and other rare earth oxides. The sintering aid(s) can be added to the precursor batch composition as carbonates, silicates, aluminates, hydrates, etc.

Still further, the ceramic precursor batch composition may comprise other additives such as surfactants, oil lubricants and pore-forming material. Non-limiting examples of surfactants that may be used as forming aids are $C_8$ to $C_{22}$ fatty acids, and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitic acids, and their derivatives, tall oil, stearic acid in combination with ammonium lauryl sulfate, and combinations of all of these. In an illustrative embodiment, the surfactant is lauric acid, stearic acid, oleic acid, tall oil, and combinations of these. In some embodiments, the amount of surfactants is from about 0.25% by weight to about 2% by weight.

Non-limiting examples of oil lubricants used as forming aids include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants are present from about 3% by weight to about 6% by weight.

The precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. When used, a particulate pore former can have a median particle diameter in the range of from 10 µm to 70 µm, and more preferably from 15 µm to 50 µm.

The inorganic ceramic forming batch components, along with any optional sintering aid and/or pore former, can be intimately blended with a liquid vehicle and forming aids which impart plastic formability and green strength to the raw materials when they are shaped into a body. When forming is done by extrusion, most typically a cellulose ether binder such as methylcellulose, hydroxypropyl methylcellulose, methylcellulose derivatives, and/or any combinations thereof, serve as a temporary organic binder, and sodium stearate can serve as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, stearic acid, oleic acid or tall oil, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. Typically, the liquid vehicle content is usually in the range of from 15% to 50% by weight of the plasticized composition. In one embodiment, the liquid vehicle component can comprise water. In another embodiment, depending on the component parts of the ceramic batch composition, it should be understood that organic solvents such as, for example, methanol, ethanol, or a mixture thereof can be used as the liquid vehicle.

Forming or shaping of the green body from the plasticized precursor composition may be done by, for example, typical ceramic fabrication techniques, such as uniaxial or isostatic pressing, slip casting, and injection molding. For example, extrusion can be used when the ceramic article is of a honeycomb geometry, such as for a catalytic converter flow-through substrate or a diesel particulate wall-flow filter. The resulting green bodies can be optionally dried, and then fired in a gas or electric kiln or by microwave heating, under conditions effective to convert the green body into a ceramic article. For example, the firing conditions effective to convert the green body into a ceramic article can comprise heating the green body at a maximum soak temperature in the range of from 1250° C. to 1450° C., for example, in the range of from 1300° C. to 1350° C., or in the range of from 1330° C. to 1380° C., and maintaining the maximum soak temperature for a hold time sufficient to convert the green body into a ceramic article, followed by cooling at a rate sufficient not to thermally shock the sintered article.

To obtain a wall-flow filter, a portion of the cells of the honeycomb structure at the inlet end or face are plugged, as known in the art. The plugging is only at the ends of the cells which is typically to a depth of about 1 to 20 mm, although this can vary. A portion of the cells on the outlet end, but not corresponding to those on the inlet end, are plugged. Therefore, each cell is plugged only at one end. The preferred arrangement is to have every other cell on a given face plugged in a checkered pattern.

EXAMPLES

Exemplary embodiments of the disclosure are further described below with respect to certain exemplary and specific embodiments thereof, which are illustrative only and not intended to be limiting.

Table 1 provides the batch compositions of Exemplary and Comparative examples of some cordierite-mullite-aluminum titanate (CMAT) composite materials in weight percent (wt %). Example 1 in Table 1 is a Comparative Example. Examples 2-13 in Table 1 are exemplary embodiments. Alumina A10 was used for the alumina source of the batch compositions in Table 1 and has a median particle size of 10-12 micrometers (d90=25-35 µm). Silica having less than 200 mesh was used as an inorganic batch component. Pre-reacted cordierite in Examples 4 and 5 consisted of cordierite grog as a raw material. In Examples 10 and 11, cordierite glass was recrystallized, textured during crystallization, milled to 20-25 µm and used as batch material. In Examples 12 and 13 cordierite raw material of Examples 10 and 11 was milled to 1-3 µm and added in a small weight fraction to the batch for seeding. Pore former package included cross-linked starch at 30 wt % and graphite at 10 wt %. Extrusion additives included methylcellulose, fatty acid, and tall oil.

TABLE 1

| | Inorganics | | | | | |
|---|---|---|---|---|---|---|
| Examples | Alumina A10 | Titanium Dioxide | Silica | Talc | Pre-reacted Cordierite | Cerium Oxide |
| 1 | 44.07 | 33.50 | 2.99 | 18.51 | | 1.00 |
| 2 | 42.88 | 33.30 | 3.11 | 19.70 | | 1.00 |
| 3 | 41.80 | 33.16 | 3.02 | 20.78 | | 1.00 |
| 4 | 37.90 | 33.27 | | 12.82 | 15.00 | 1.00 |
| 5 | 36.88 | 33.12 | | 14.00 | 15.00 | 1.00 |
| 6 | 42.90 | 34.28 | 2.50 | 19.31 | | 1.00 |
| 7 | 41.09 | 35.52 | 1.57 | 20.83 | | 1.00 |
| 8 | 41.46 | 38.27 | | 19.29 | | 0.98 |
| 9 | 42.84 | 35.81 | 1.65 | 18.72 | | 0.98 |
| 10 | 37.90 | 33.27 | | 12.82 | 15.00 | 1.00 |
| 11 | 36.88 | 33.12 | | 14.00 | 15.00 | 1.00 |
| 12 | 42.66 | 32.43 | 2.89 | 17.92 | 3.00 | 1.00 |
| 13 | 40.54 | 32.17 | 2.92 | 20.16 | 3.00 | 1.00 |

Table 2 provides batch compositions of Examples of some cordierite-mullite-aluminum titanate (CMAT) composite materials in weight percent (wt %) according to exemplary embodiments of the present disclosure. The Alumina Coarse was used for the alumina source of the batch compositions in Table 2 and has a median particle size of 15-17 micrometer (µm). The titanium dioxide, silica, and talc in the Examples of Table 2 is as in the Examples of Table 1. Pore former package includes starch at 28 wt % and graphite at 10 wt % in the Examples of Table 2. Extrusion additives included methylcellulose and tall oil.

TABLE 2

| | Inorganics | | | | |
|---|---|---|---|---|---|
| Examples | Alumina Coarse | Titanium Dioxide | Silica | Talc | Cerium Oxide |
| 14 | 41.71 | 33.09 | 3.01 | 20.74 | 1.46 |
| 15 | 42.13 | 33.42 | 2.02 | 20.95 | 1.47 |
| 16 | 43.00 | 34.11 | 0.00 | 21.38 | 1.51 |
| 17 | 41.30 | 32.76 | 3.96 | 20.53 | 1.45 |
| 18 | 40.50 | 32.13 | 5.83 | 20.14 | 1.42 |
| 19 | 40.55 | 32.17 | 0.00 | 25.81 | 1.42 |
| 20 | 42.94 | 34.06 | 6.13 | 15.37 | 1.50 |
| 21 | 41.58 | 32.98 | 5.30 | 18.68 | 1.46 |
| 22 | 42.69 | 33.87 | 2.72 | 19.23 | 1.49 |

Examples 15 through 22 vary the silica and magnesia batch content from Example 14. Examples 15 and 16 have 1 wt % and 3 wt % less $SiO_2$, respectively, than Example 14. Examples 17 and 18 have 1 wt % and 3 wt % more $SiO_2$, respectively, than Example 14. Examples 19 and 20 have 1.8 wt % more and 1.8 wt % less MgO, respectively, than Example 14. Example 21 has 2 wt % $SiO_2$ and 2 wt % MgO more than Example 14 and Example 22 has 2 wt % $SiO_2$ and 2 wt % MgO less than Example 14.

Honeycomb porous ceramics with anisotropic microstructure were made by ram or twin screw extrusion. Inorganic raw materials, pore former and binder were combined in a pan and mulled under addition of batch water until a suitable paste texture was reached.

Table 3 shows phase fractions in weight percent (wt %) of Example compositions from Table 1 that are obtained when firing 2" (5.1 cm) honeycomb of the different batch materials at the given firing conditions. The top firing temperature (° C.) and time in hours (hr) are shown (Firing). Examples fired at 1357° C. were fired in a gas kiln, all other Examples were fired in an electric kiln. Phase fractions of pseudobrookite (AT) together with its Mg substitution level "x" in $Al_{2(1-x)}Mg_xTi_{(1+x)}O$, corundum (Coru), rutile (Rut), cordierite (Cor), mullite (Mul), cerium-titanate solid solution (Ce-titan), and phase ratio of cordierite-to-mullite (Cor/Mul) are shown. The phase fractions were determined by X-ray diffraction. Ceria and mixed cerium oxide phase levels <1 wt % were below detection limit.

Table 4 summarizes phase fractions in wt % of pseudo-brookite (AT) together with its Mg substitution level "x" in $Al_{2(1-x)}Mg_xTi_{(1+x)}O$, corundum (Coru), rutile (Rut), cordierite (Cor), mullite (Mul), cerium-titanate solid solution (Ce-titan), sapphirine (Sapph), and phase ratio of cordierite-to-mullite (Cor/Mul) obtained from firing 1" (2.54 cm) honeycomb of the different batch materials of Table 2 at the given firing conditions of top temperature (° C.) and time (hr). The phase fractions were determined by X-ray diffraction. Sapphirine phase levels <1 wt % were below detection limit.

TABLE 4

| Ex. No. | Firing (° C./hr) | AT | x | Coru | Rut | Cor | Mul | Ce-titan | Sapph | Cor/Mul |
|---|---|---|---|---|---|---|---|---|---|---|
| 14 | 1340/16 | 64.00 | 0.21 | 2.30 | 1.00 | 19.00 | 11.70 | 1.50 | | 1.62 |
| 15 | 1340/16 | 66.00 | 0.21 | 2.00 | 0.40 | 18.00 | 11.70 | 1.60 | | 1.54 |
| 16 | 1340/16 | 66.00 | 0.20 | 2.20 | 0.60 | 15.00 | 10.00 | 1.40 | 4.90 | 1.50 |
| 17 | 1340/16 | 62.00 | 0.20 | 2.60 | 1.00 | 21.00 | 12.00 | 1.70 | | 1.75 |
| 18 | 1340/16 | 63.00 | 0.19 | 3.10 | 1.10 | 22.00 | 9.10 | 1.80 | | 2.42 |
| 19 | 1340/16 | 60.00 | 0.21 | 1.40 | 1.50 | 21.00 | 5.90 | 1.70 | 8.50 | 3.56 |
| 20 | 1340/16 | 64.00 | 0.18 | 3.30 | 2.00 | 13.00 | 16.00 | 1.60 | | 0.81 |
| 21 | 1340/16 | 64.00 | 0.19 | 3.00 | 1.40 | 19.00 | 12.00 | 1.60 | | 1.58 |
| 22 | 1340/16 | 64.00 | 0.20 | 2.60 | 0.80 | 17.00 | 14.10 | 1.40 | | 1.21 |
| 14 | 1320/16 | 58.00 | 0.23 | 6.00 | 1.70 | 21.00 | 12.30 | 1.10 | | 1.71 |
| 15 | 1320/16 | 54.00 | 0.22 | 5.00 | 2.80 | 22.00 | 14.00 | 1.10 | | 1.57 |
| 16 | 1320/16 | 61.00 | 0.22 | 5.00 | 1.30 | 15.00 | 11.00 | 1.30 | 6.50 | 1.36 |
| 17 | 1320/16 | 57.00 | 0.22 | 5.60 | 2.10 | 22.00 | 12.00 | 1.00 | | 1.83 |
| 18 | 1320/16 | 54.00 | 0.21 | 6.10 | 3.70 | 24.00 | 10.00 | 1.00 | | 2.40 |
| 19 | 1320/16 | 55.00 | 0.23 | 2.50 | 2.00 | 21.00 | 7.60 | 1.10 | 11.20 | 2.76 |
| 20 | 1320/16 | 53.00 | 0.19 | 7.00 | 5.40 | 16.00 | 18.00 | 1.00 | | 0.89 |
| 14 | 1350/16 | 58.00 | 0.23 | 5.60 | 1.70 | 21.00 | 12.00 | 1.10 | | 1.75 |
| 15 | 1350/16 | 54.00 | 0.22 | 5.30 | 2.80 | 22.00 | 14.00 | 1.10 | | 1.57 |
| 16 | 1350/16 | 61.00 | 0.22 | 4.50 | 1.30 | 15.00 | 11.00 | 1.30 | 6.50 | 1.36 |
| 17 | 1350/16 | 57.00 | 0.22 | 5.60 | 2.10 | 22.00 | 12.00 | 1.00 | | 1.83 |
| 18 | 1350/16 | 54.00 | 0.21 | 6.10 | 3.70 | 24.00 | 10.00 | 1.00 | | 2.40 |
| 19 | 1350/16 | 55.00 | 0.23 | 2.50 | 2.00 | 21.00 | 7.60 | 1.10 | 11.00 | 2.76 |
| 20 | 1350/16 | 53.00 | 0.19 | 7.00 | 5.40 | 16.00 | 18.00 | 1.00 | | 0.89 |

TABLE 3

| Ex. No. | Firing (° C./hr) | AT | x | Coru | Rut | Cor | Mul | Ce-titan | Cor/Mul |
|---|---|---|---|---|---|---|---|---|---|
| 1 | 1340/16 | 64.26 | 0.20 | 1.67 | 0.02 | 14.46 | 19.58 | | 0.74 |
| 1 | 1357/16 | 66.54 | 0.20 | 2.57 | 0.00 | 15.36 | 15.53 | | 0.99 |
| 2 | 1340/16 | 67.15 | 0.19 | 2.42 | 0.13 | 17.76 | 12.54 | | 1.42 |
| 2 | 1357/16 | 68.59 | 0.19 | 3.33 | 0.00 | 18.35 | 9.73 | | 1.89 |
| 3 | 1340/16 | 67.68 | 0.20 | 2.05 | 0.04 | 19.45 | 10.79 | | 1.80 |
| 3 | 1357/16 | 67.97 | 0.20 | 2.81 | 0.00 | 20.42 | 8.79 | | 2.32 |
| 4 | 1340/16 | 71.52 | 0.17 | 2.28 | 0.00 | 17.35 | 8.85 | | 1.96 |
| 4 | 1357/16 | 71.24 | 0.16 | 3.03 | 0.00 | 18.57 | 7.16 | | 2.59 |
| 5 | 1340/16 | 71.51 | 0.18 | 1.90 | 0.00 | 19.04 | 7.55 | | 2.52 |
| 5 | 1357/16 | 72.40 | 0.17 | 3.11 | 0.00 | 20.02 | 4.47 | | 4.48 |
| 6 | 1340/16 | 68.46 | 0.20 | 2.12 | 0.00 | 16.33 | 13.09 | | 1.25 |
| 6 | 1357/16 | 70.44 | 0.19 | 2.84 | 0.00 | 16.84 | 9.88 | | 1.70 |
| 7 | 1340/16 | 72.76 | 0.20 | 1.63 | 0.00 | 17.75 | 7.86 | | 2.26 |
| 8 | 1357/16 | 77.00 | 0.20 | 2.00 | 0.00 | 14.00 | 7.20 | | 1.94 |
| 9 | 1357/16 | 72.00 | 0.20 | 2.90 | 0.00 | 15.00 | 9.70 | | 1.55 |
| 10 | 1320/16 | 65.12 | 0.18 | 6.56 | 1.51 | 20.32 | 5.08 | 1.42 | 4.00 |
| 10 | 1340/16 | 66.92 | 0.18 | 4.15 | 0.61 | 19.35 | 7.57 | 1.40 | 2.56 |
| 11 | 1320/16 | 65.85 | 0.18 | 6.02 | 1.05 | 22.32 | 3.37 | 1.40 | 6.62 |
| 11 | 1340/16 | 68.33 | 0.18 | 4.11 | 0.27 | 20.92 | 5.08 | 1.30 | 4.12 |
| 12 | 1320/16 | 65.07 | 0.17 | 7.56 | 0.77 | 20.94 | 4.18 | 1.48 | 5.01 |
| 12 | 1340/16 | 66.37 | 0.17 | 5.08 | 0.31 | 19.37 | 7.55 | 1.32 | 2.57 |
| 13 | 1320/16 | 63.44 | 0.19 | 6.08 | 1.02 | 24.62 | 3.18 | 1.67 | 7.74 |
| 13 | 1340/16 | 65.32 | 0.19 | 4.04 | 0.35 | 23.56 | 5.42 | 1.32 | 4.35 |

Table 5 summarizes the physical material properties of 2" (5.1 cm) twin screw extruded honeycomb in geometry of 300 cells psi (46.5 cells/cm$^2$) and 13 mil (0.33 mm) wall thickness (300/13) after firing at the indicated conditions. The top firing temperature (° C.) and time (hr) are shown (Firing). Examples fired at 1357° C. were fired in a gas kiln, all other Examples were fired in an electric kiln. Pore size distributions were explored by mercury intrusion porosimetry using an Autopore® IV 9500 porosimeter. Porosity in percent is indicated in Table 5 by P (%). Mercury porosimetry data were used to derive material permeability. Permeability is the relationship of fluid flow rate and applied pressure. In the measurement system, pressure is increased so that mercury penetrates narrower pore channels and fills an increasing volume of the porosity until a critical pressure is reached where the mercury spans the sample. Permeability is typically expressed with the equation k=1/226 $(L_c)_2$ σ/σ$_0$ where σ is the conductivity at length $L_c$ and σ$_0$ is the conductance in the pore and reported in Table 5 in mDarcy.

Thermal expansion was measured for bar-shaped samples with dimensions 0.25"×0.25"×2" (0.64×0.64×5.1 cm) during heating from room temperature to 1200° C. at a rate of 4° C./min and subsequent cooling to room temperature. For the data reported in the Tables 5 and 6, the long axis of the test bar was oriented in the direction of the honeycomb channels, thus providing the thermal expansion in the axial direction of the honeycomb parts. Average thermal expansion coefficients for various temperature ranges are recorded in Tables 5 and 6, CTE$^{20-800}$ in K$^{-1}$, the average thermal expansion coefficient from room temperature to 800° C., defined as L(800° C.)–L(20° C.)/780° C. as average thermal expansion coefficient in the temperature range from room temperature to 800° C., and $CTE^{200-1000}$ in $K^{-1}$, the average thermal expansion coefficient from room temperature to 1000° C., defined as L(1000° C.)–L(20° C.)/980° C. as average thermal expansion coefficient in the temperature range from room temperature to 1000° C.

The reported ceramic strength was tested using four-point bending. The maximum stress prior to failure is often referred to as the modulus of rupture or MOR. Strength (4-point flexure MOR) has been measured according to ASTM standard procedure by four point flexure using bars with a lower span of 2" (50.8 mm) and an upper span of 0.75" (19 mm).

Bar-shaped samples with dimension 5"×1"×0.5" (12.7× 2.54×1.27 cm) and the long axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight by referring to ASTM C 1198-01.

A strain tolerance, MOR/E-mod, was derived from the strength of the material and its Young's modulus. This strain tolerance describes the ability of a material to handle strain. The higher the strain tolerance, the less likely the material will fracture. The strain tolerance is independent of the honeycomb geometry and can directly be compared for parts with different cell densities or wall thickness.

TABLE 5

| Ex. No. | Firing (° C./hr) | P (%) | d50 (μm) | (d50 − d10)/d50 | perm (mDarcy) | CTE (800° C.) $10^{-7}K^{-1}$ | CTE (1000° C.) $10^{-7}K^{-1}$ | MOR (psi) | Emod RT (psi) | Strain Tol (=MOR/Emod) |
|---|---|---|---|---|---|---|---|---|---|---|
| 1 | 1340/16 | 56.07 | 15.40 | 0.15 | 858 | | | | | |
| 1 | 1357/16 | 58.14 | 13.93 | 0.15 | 740 | 13.60 | 16.20 | 302 | 2.84E+05 | 0.00106 |
| 1 | 1310/16 | 60.50* | | | | 15.50 | 18.90 | | | |
| 1 | 1320/16 | 60.80* | | | | 15.70 | 18.80 | | | |
| 1 | 1330/16 | 60.40* | | | | 15.20 | 18.40 | | | |
| 1 | 1340/16 | 59.90* | | | | 15.50 | 18.50 | | | |
| 2 | 1340/16 | 59.53 | 16.67 | 0.15 | 1060 | | | | | |
| 2 | 1357/16 | 59.93 | 15.01 | 0.16 | 871 | 13.10 | 16.50 | 315 | 2.46E+05 | 0.00128 |
| 3 | 1340/16 | 61.27 | 16.97 | 0.17 | 1101 | 11.60 | 14.60 | | | |
| 3 | 1357/16 | 60.57 | 15.73 | 0.17 | 936 | 11.70 | 15.00 | 281 | 2.19E+05 | 0.00128 |
| 3 | 1310/16 | 61.20* | | | | 13.20 | 16.50 | | | |
| 3 | 1320/16 | 60.82 | 14.29 | 0.17 | | 12.30 | 15.60 | | | |
| 3 | 1330/16 | 61.10* | | | | 12.30 | 15.40 | | | |
| 3 | 1340/16 | 60.50* | | | | 13.00 | 15.10 | | | |
| 4 | 1340/16 | 53.23 | 15.33 | 0.18 | 783 | | | | | |
| 4 | 1357/16 | 52.98 | 13.28 | 0.21 | 588 | 14.30 | 18.20 | 429 | 3.78E+05 | 0.00113 |
| 5 | 1340/16 | 48.68 | 14.25 | 0.20 | 599 | | | | | |
| 5 | 1357/16 | 54.99 | 14.26 | 0.20 | 672 | 13.90 | 18.10 | 434 | 3.67E+05 | 0.00118 |
| 5 | 1310/16 | 56.90* | | | | 17.90 | 22.20 | | | |
| 5 | 1320/16 | 56.70* | | | | 14.10 | 18.80 | | | |
| 5 | 1330/16 | 54.80* | | | | 14.80 | 18.60 | | | |
| 5 | 1340/16 | 48.00* | | | | 12.30 | 16.10 | | | |
| 6 | 1340/16 | 58.88 | 16.78 | 0.16 | 1054 | | | | | |
| 6 | 1357/16 | 60.25 | 15.31 | 0.16 | 900 | 13.30 | 16.80 | 323 | 2.43E+05 | 0.00133 |
| 7 | 1340/16 | 58.65 | 15.69 | 0.14 | 946 | 11.10 | 14.20 | | | |
| 8 | 1357/16 | 59.00 | 13.00 | 0.15 | | | | | | |
| 9 | 1357/16 | 59.00 | 14.00 | 0.16 | | | | | | |
| 10 | 1320/16 | 58.40 | 14.84 | 0.19 | | 16.5 | 24.2 | | | |
| 10 | 1340/16 | 58.92 | 15.60 | 0.15 | 931 | 14.9 | 21.8 | | | |
| 11 | 1320/16 | 56.91 | 13.75 | 0.22 | | 13.5 | 21 | | | |
| 11 | 1340/16 | 54.10 | 14.58 | 0.18 | 711 | 14.4 | 18 | | | |
| 12 | 1320/16 | 58.09 | 14.26 | 0.22 | | 15.5 | 23.3 | | | |
| 12 | 1340/16 | 57.17 | 15.31 | 0.20 | 777 | 17.1 | 20.5 | | | |
| 13 | 1320/16 | 59.46 | 14.56 | 0.22 | | 14.4 | 21.7 | | | |
| 13 | 1340/16 | 57.28 | 15.31 | 0.21 | 773 | 17.1 | 20.4 | | | |

*porosity determined by Archimedes technique

Table 6 summarizes the physical material properties of 1" (2.54 cm) ram extruded honeycomb in geometry (300/14) after indicated firing in an electric kiln.

TABLE 6

| Ex. No. | Firing (° C./hr) | P (%) | d50 (μm) | (d50 − d10)/ d50 | CTE (800° C.) $10^{-7}K^{-1}$ | CTE (1000° C.) $10^{-7}K^{-1}$ | MOR (psi) |
|---|---|---|---|---|---|---|---|
| 14 | 1340/16 | 57.86 | 21.12 | 0.18 | 10.20 | 13.30 | 139 |
| 14 | 1320/16 | 56.60 | 18.30 | 0.18 | 9.77 | 15.20 | |
| 14 | 1350/16 | 55.46 | 19.17 | 0.19 | 7.9 | 10.9 | |
| 15 | 1340/16 | 58.47 | 19.95 | 0.16 | 11.30 | 14.30 | 158 |
| 16 | 1340/16 | 54.80 | 17.61 | 0.16 | 12.60 | 15.80 | 156 |
| 17 | 1340/16 | 61.68 | 25.92 | 0.22 | 8.50 | 11.60 | |
| 18 | 1340/16 | 58.12 | 25.51 | 0.20 | 11.20 | 14.70 | 147 |
| 19 | 1340/16 | 61.42 | 21.96 | 0.21 | 11.20 | 14.10 | 132 |
| 20 | 1340/16 | 56.34 | 24.82 | 0.18 | 16.60 | 20.70 | 176 |
| 21 | 1340/16 | 56.63 | 23.39 | 0.17 | 11.40 | 14.80 | 173 |
| 22 | 1340/16 | 53.81 | 19.54 | 0.20 | 14.20 | 17.10 | 144 |
| 15 | 1320/16 | 59.1 | 18.1 | 0.17 | 7.9 | 13 | |
| 16 | 1320/16 | 59 | 17 | 0.16 | 10.1 | 15.4 | |
| 17 | 1320/16 | 61 | 20.6 | 0.19 | 7.9 | 13.2 | |
| 18 | 1320/16 | 61.2 | 20.3 | 0.19 | 10.3 | 16.4 | |
| 19 | 1320/16 | 64.1 | 20.4 | 0.21 | 11.1 | 17.1 | |
| 20 | 1320/16 | 62.7 | 19.3 | 0.22 | 14.6 | 22.2 | |
| 15 | 1350/16 | 56.41 | 17.44 | 0.19 | 8.2 | 11.3 | |
| 16 | 1350/16 | 55.23 | 18.48 | 0.17 | 10.3 | 13.5 | |
| 17 | 1350/16 | 61.69 | 22.21 | 0.22 | 7.1 | 10.2 | |
| 18 | 1350/16 | 58.68 | 23.46 | 0.24 | 9.2 | 12.6 | |
| 19 | 1350/16 | 59.52 | 23.46 | 0.19 | 8 | 10.9 | |
| 20 | 1350/16 | 59.88 | 24.99 | 0.22 | 12.9 | 16.9 | |

FIG. 2 is a graphical plot of data from the Comparative Example 1 and Examples 2-22 according to exemplary embodiments of the present disclosure showing coefficient of thermal expansion (CTE) from room temperature (25° C.) to 800° C. ($10^{-7}$ $K^{-1}$) as a function of cordierite/mullite ratio for different firings of materials with silica and magnesia batch content variation. Firing at 1340° C./16 hr is indicated by open diamonds, firing at 1350° C./16 hr is indicated by open squares, and firing at 1320° C./16 hr is indicated by solid triangles. It is shown in FIG. 2 that as the cordierite/mullite ratio approaches about 2, a minimum in the CTE is reached. Line 201 indicates a decreasing CTE as the cordierite/mullite ratio increases from about 1 to about 2, line 202 indicates a decreasing CTE as the cordierite/mullite ratio decreases from about 2.5 to about 2, and line 203 indicates a slight decrease in CTE as the cordierite/mullite ratio decreases from about 4 to about 3.

FIG. 3 is a graphical plot of data from the Examples according to exemplary embodiments of the present disclosure showing CTE from room temperature to 800° C. ($10^{-7}$ $K^{-1}$) as a function of cordierite/mullite ratio for different firings of materials batched for different cordierite/mullite fractions. The solid squares indicate cordierite to mullite ratio change and the solid diamonds indicate cordierite grog-derived materials. FIG. 3 illustrates the CTE evolution for 1" (2.54 cm) parts and different batches as function of cordierite/mullite phase ratio and shows a clear trend for these batches with variations in silica and/or magnesia batch content with a decrease in CTE for increasing cordierite/mullite ratios up to about 2 and then an increase for ratios greater than 2. Line 301 indicates a decreasing CTE as the cordierite/mullite ratio increases from about 1 to slightly greater than 2, line 302 indicates a decreasing CTE as the cordierite/mullite ratio decreases between 2 and 3, and line 303 indicates little change in CTE as the cordierite/mullite ratio decreases from about 4.5 to slightly less than 3.

Figure 4:
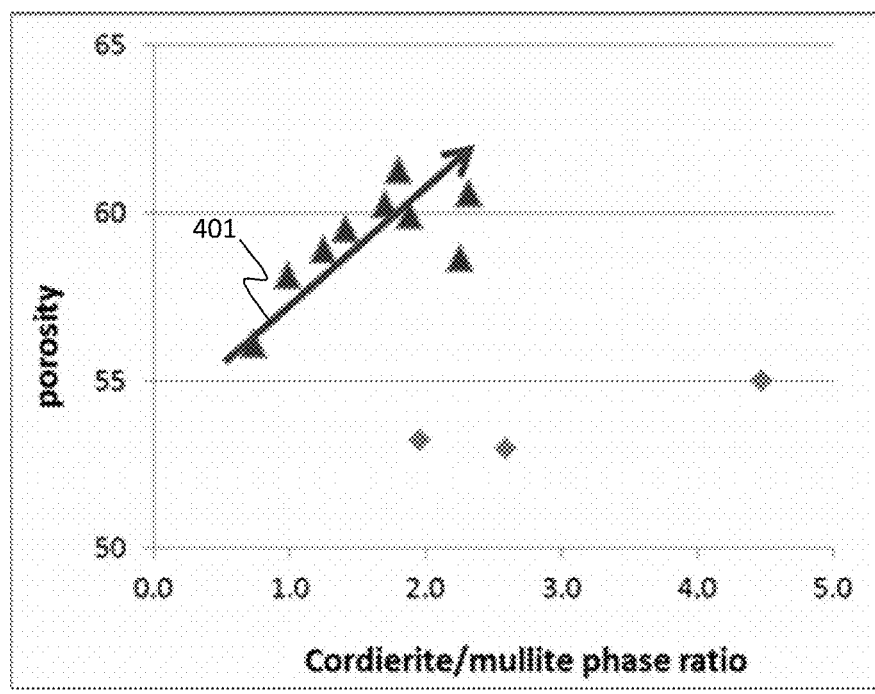
FIG. 4 and FIG. 5 are graphical plots of data from Examples according to exemplary embodiments of the present disclosure showing percent porosity and median pore diameter (d50) in µm, respectively, as a function of cordierite/mullite ratio.
Figure 5:
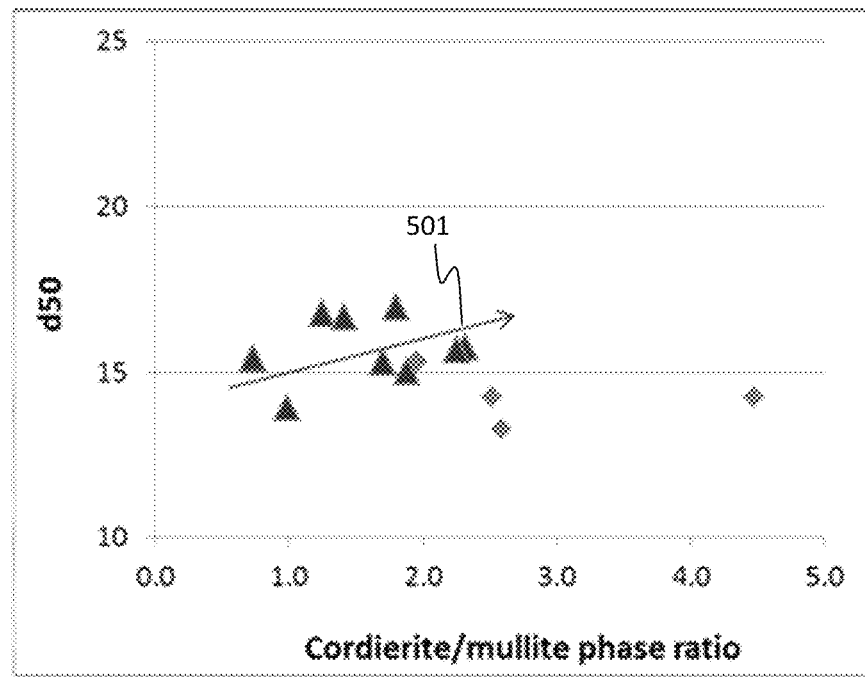

FIG. 4 and FIG. 5 are graphical plots of data from the Examples according to exemplary embodiments of the present disclosure showing percent porosity and median pore diameter (d50) in μm, respectively, as a function of cordierite/mullite ratio. Solid triangles indicate cordierite reaction-formed materials and solid diamonds indicate cordierite grog-derived materials. FIGS. 4 and 5 illustrate that for use of the same pore former package and firing conditions, the porosity increases with increasing cordierite/mullite ratio, while the median pore size shows only little evolution. That is, for example, for high cordierite/mullite ratios, less pore former is necessary to reach the same porosity. Line 401 indicates trending increase in porosity as the cordierite/mullite ratio increases from about 1 to about 2. Line 501 indicates trending increase in $d_{50}$ as the cordierite/mullite ratio increases from about 1 to about 2.

Figure 6:
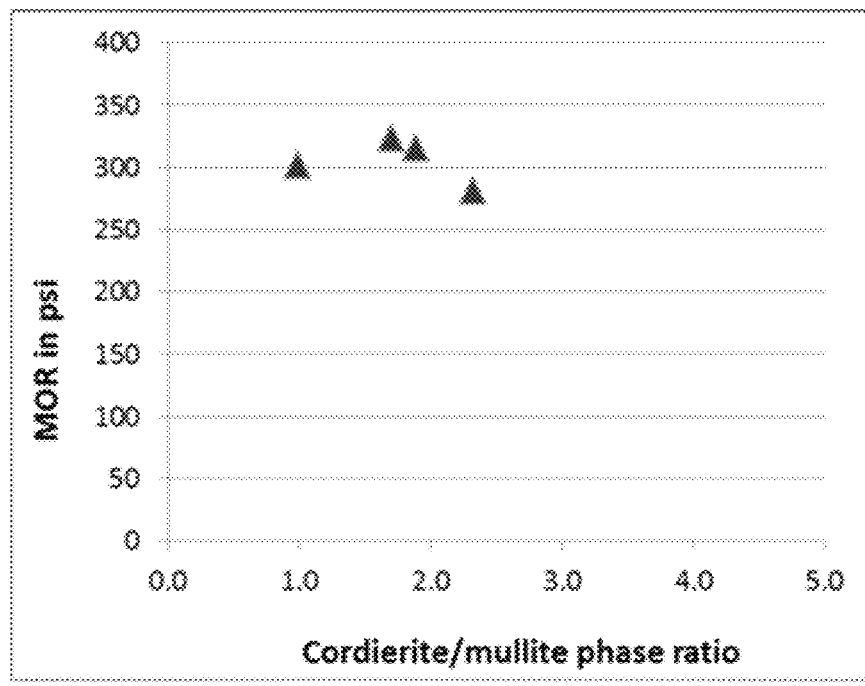
FIG. 6 and FIG. 7 are graphical plots of data from Examples according to exemplary embodiments of the present disclosure showing modulus of rupture (MOR), a measure of strength in pounds per square inch (psi), and strain tolerance (%), respectively, as a function of cordierite/mullite ratio.
Figure 7:
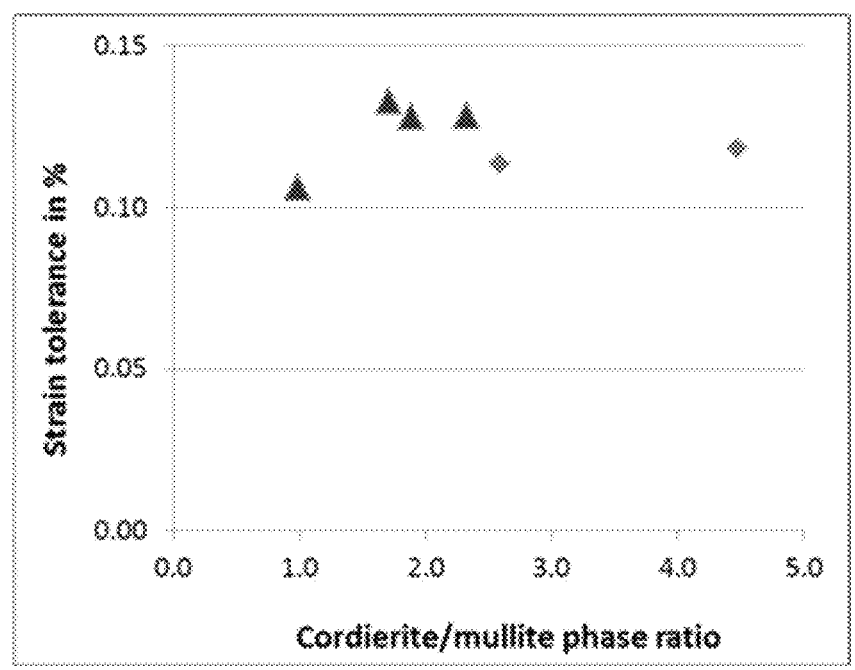

FIG. 6 and FIG. 7 are graphical plots of data from the Examples according to exemplary embodiments of the present disclosure showing modulus of rupture (MOR), a measure of strength in pounds per square inch (psi), and strain tolerance (%), respectively, as a function of cordierite/mullite ratio. Solid triangles indicate cordierite reaction-formed materials and solid diamonds indicate cordierite grog-derived materials. FIGS. 6 and 7 illustrate that for use of the same pore former package and firing conditions, MOR remains unchanged, while the strain tolerance is higher for increased cordierite/mullite ratio.

Figure 8:
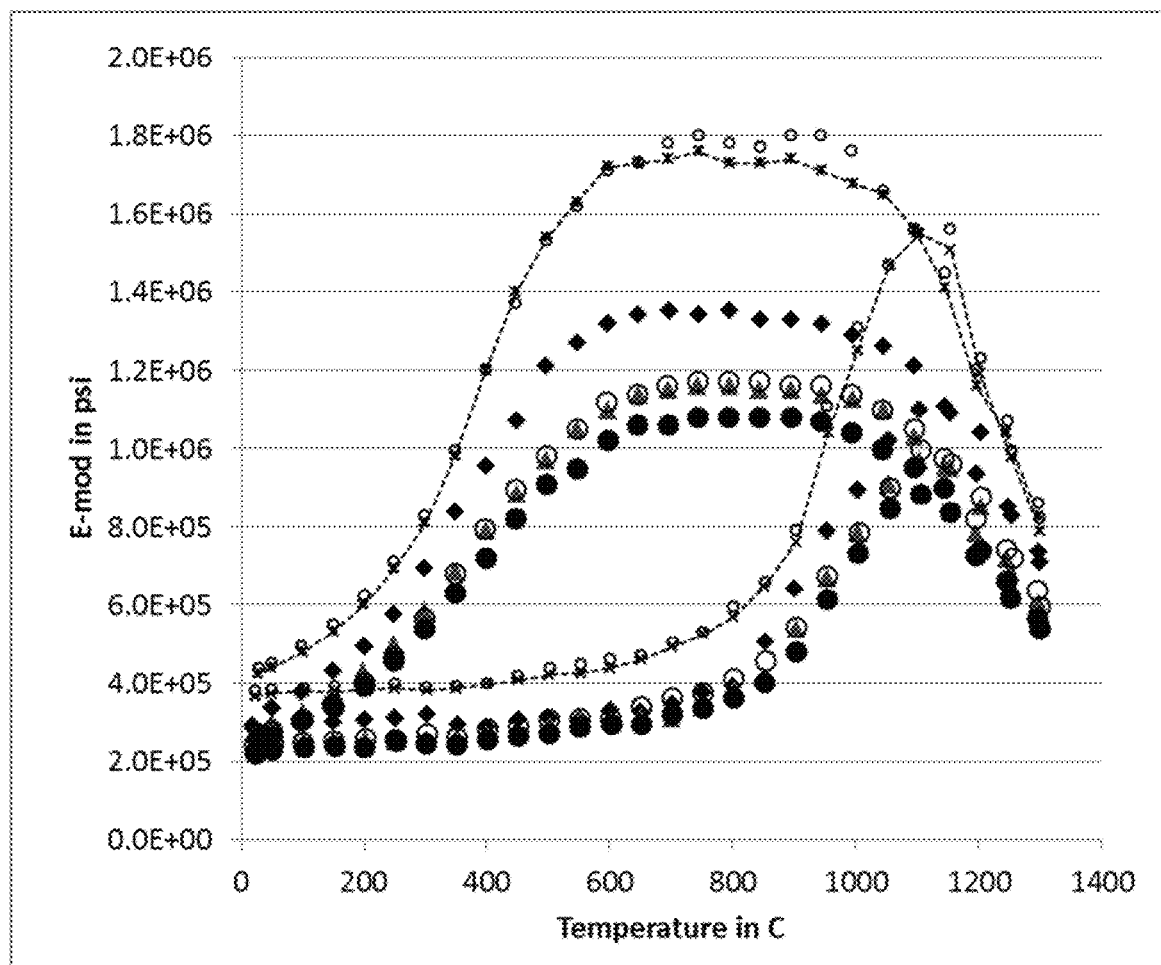
FIG. 8 is a graphical plot of data from Examples according to exemplary embodiments of the present disclosure showing the elastic modulus as function of temperature during a heating and cooling cycle for different materials as a function of cordierite/mullite ratio.

FIG. 8 is a graphical plot of data from the Examples according to exemplary embodiments of the present disclosure showing the elastic modulus as function of temperature during a heating-cooling cycle for different Examples as a function of cordierite/mullite ratio. Shown are Comparative Example 1 (black diamonds), Example 2 (triangles), Example 3 (large solid circles), Example 4 (small open circles), Example 5 (dashed line with x's), and Example 6 (large open circles), illustrating that the elastic modulus cycling curve is shifted with increasing cordierite/mullite ratio to lower values and that all cordierite grog-derived materials exhibit substantially higher elastic modulus.

Figure 9:
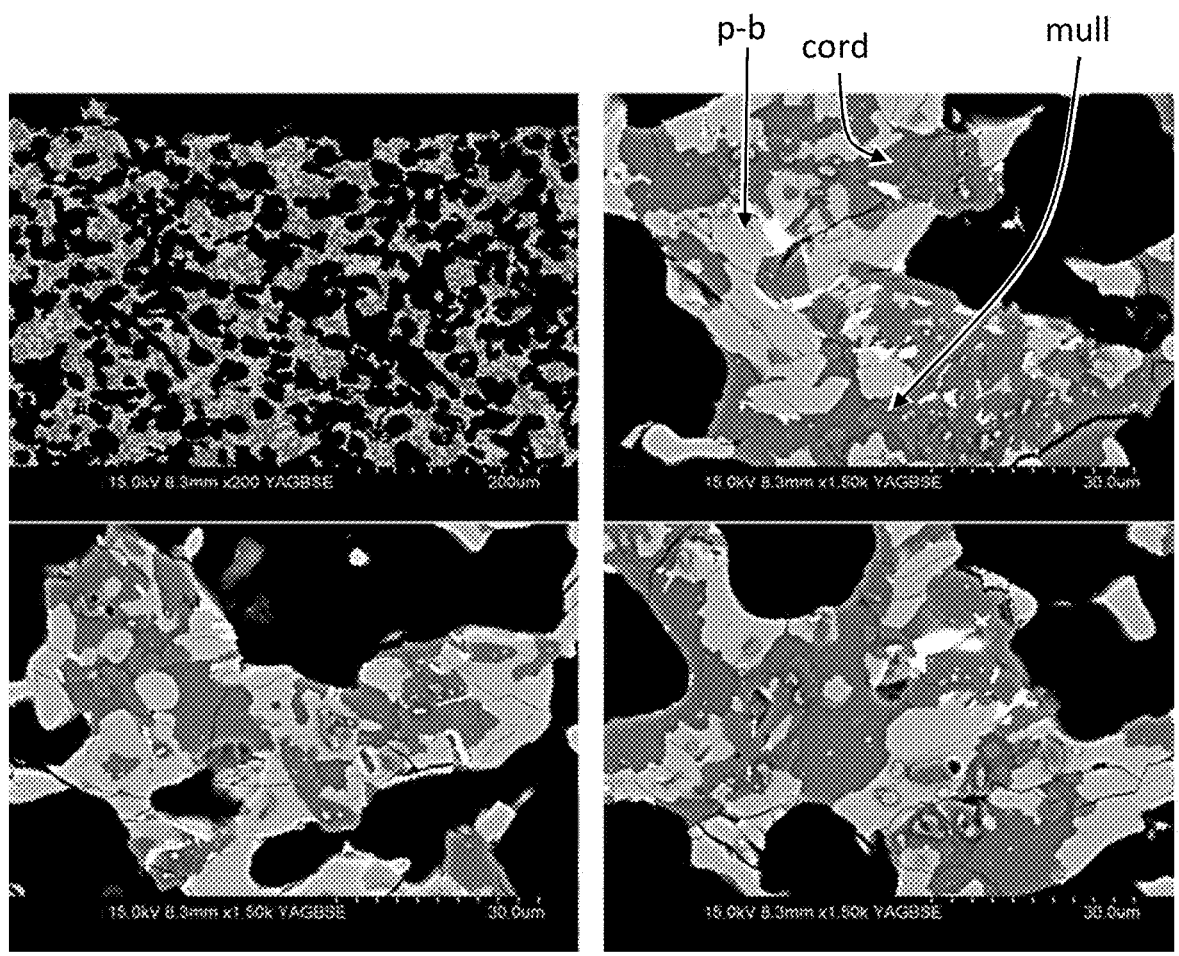
FIG. 9 shows scanning electron microscope (SEM) micrographs of polished fired ware Comparative Example 1 fired at 1357° C./16 h demonstrating at low magnification the regular pore structure and at higher magnification the phase distribution with pseudobrookite phase in bright grey, cordierite in dark grey, mullite in intermediate grey level, cerium titanate phase in white, and microcracks.

FIG. 9 shows scanning electron microscope (SEM) micrographs of polished fired ware Comparative Example 1 fired at 1357° C./16 h demonstrating at low magnification the regular pore structure and at higher magnification the phase distribution with pseudobrookite phase in bright grey, cordierite in dark grey, mullite in intermediate grey level, cerium titanate phase in white, and microcracks.

Figure 10:
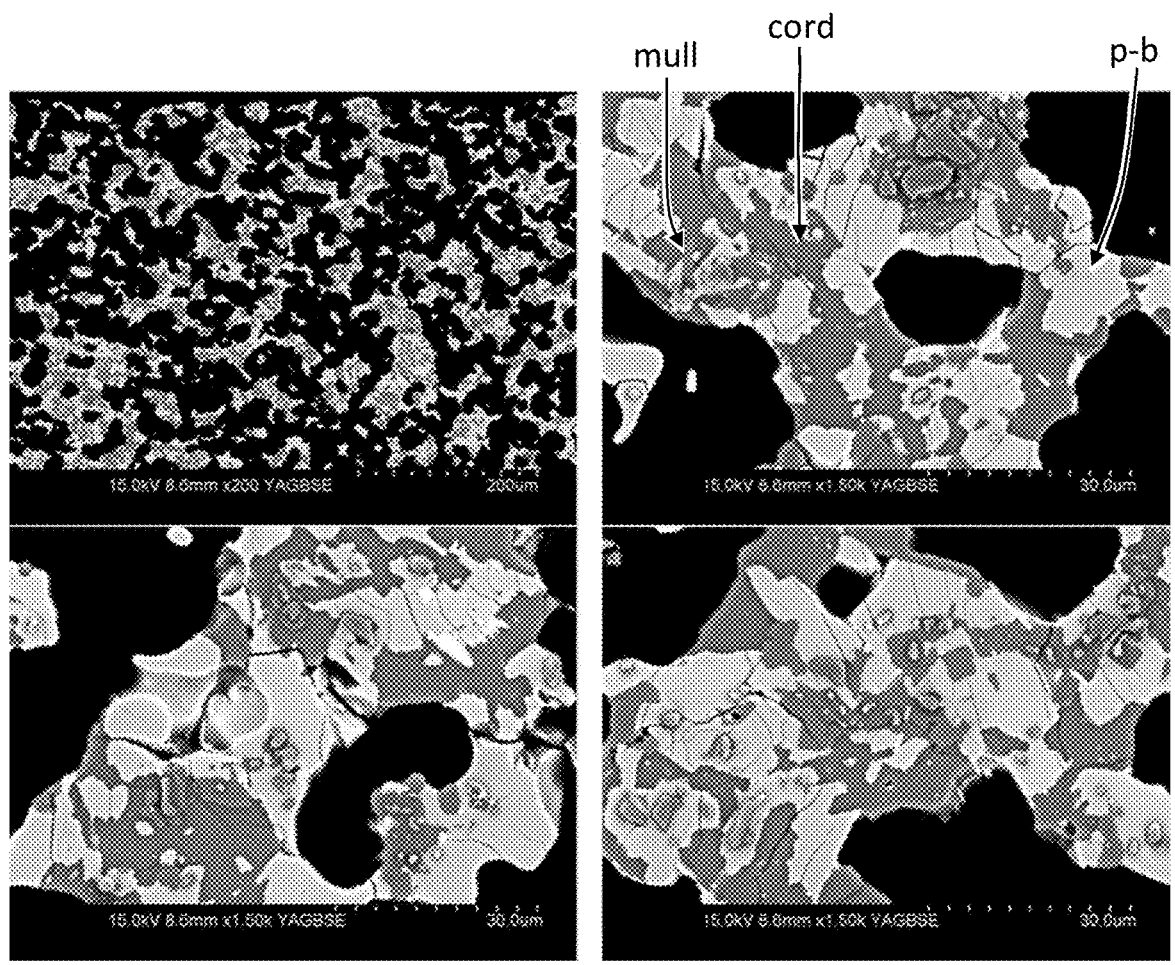
FIG. 10 shows scanning electron microscope (SEM) micrographs of polished fired ware Example 3 fired at 1357° C./16 h demonstrating at low magnification the regular pore structure and at higher magnification the phase distribution with pseudobrookite phase in bright grey, cordierite in dark grey, mullite in intermediate grey level, cerium titanate phase in white, and microcracks.

FIG. 10 shows scanning electron microscope (SEM) micrographs of polished fired ware Example 3 fired at 1357° C./16 h demonstrating at low magnification the regular pore structure and at higher magnification the phase distribution with pseudobrookite phase in bright grey, cordierite in dark grey, mullite in intermediate grey level, cerium titanate phase in white, and microcracks.

The phases present in the fired parts were identified by X-ray diffraction (XRD). A Bruker D4 diffraction system equipped with a multiple strip LynxEye high speed detector was utilized. High resolution spectra were typically acquired from 15 to 100° (2θ). Rietveld refinement was used for quantification of the phase contributions.

Global texture of the pseudobrookite and cordierite phases in presence was determined by comparing the intensity ratios of suited peaks in axial and tangential directions of the honeycomb to that of the powdered honeycomb (random orientation). After indexing the patterns, it was fairly obvious that preferred orientation existed in the cordierite phase, with a tendency towards reverse orientation.

Cordierite and AT orientation indices were selected to compare the degree of preferred orientation of the AT phase in the samples. The multiphase mixture and extensive overlap of peaks made it difficult to use traditional orientation indices. Two approaches were used to solve this problem, firstly, peaks without any overlap were used to define some unusual (mixed) orientation indices were defined and, secondly, deconvoluted peak intensities after Rietveld analysis were used to extract the traditional orientation indices. The following orientation indexes were used:

Cordierite I-ratio i-ratio=$I_{(110)}/[I_{(110)}+I_{(002)}]$

Cordierite orientation index $I_{cor}=I_{(100)}/[I_{(100)}+I_{(102)}]$

AT Orientation Indexes $I_{ATI}=I_{(230)}/[I_{(230)}+I_{(101)}]$ (overlap)

$I_{ATII}=I_{(200)}/[I_{(200)}+I_{(101)}]$ (overlap)

$I_{ATI}=I_{(002)}/[I_{(002)}+I_{(200)}]$ (less overlap)

$I_{ATI}=I_{(101)}/[I_{(101)}+I_{(200)}]$ (less overlap)

with I being the peak intensity for the Miller Indices in parenthesis.

Orientation indices were determined by X-ray Dispersive Spectroscopy (XRD) for cordierite and aluminum titanate on fired honeycomb cross section (axial), on fired honeycomb wall surfaces (tangential) and on polished wall surfaces (tangential polished). Data was acquired for the Comparative Example and the Examples according to exemplary embodiments of the disclosure for as-fired and polished walls to distinguish preferential surface alignment from bulk alignment. Since peaks representative exclusively of negative or positive expansion directions were not well separated, some mixed texture indices were defined that could be derived from peaks without peak overlap. In addition, Rietveld-deconvoluted peak intensities were used. The differences between both approaches were small. While axial results produced meaningful trends, all tangential data suffered strong scattering due to the surface roughness and lack of in-wall surface quality inherent of 1" (2.54 cm) extruded ware. The coefficients for random orientation were determined from milled honeycomb powder and added to the table as "random" (milled powder). Orientation indices are summarized in Table 7 for the different materials and firing conditions. Table 7 provides axial texture coefficients acquired on the axial honeycomb web and tangential texture coefficients from as-fired wall surfaces and polished walls. Table 7 also includes in Examples 1, 2, 3 ground powders that were used to derive the values of the texture factors for random orientation. The cordierite i-ratio was difficult to derive directly from the measured peak intensities due to severe peak overlap; therefore, peaks of mixed contributions of high and low expansion axis were used. Those texture factors are also listed in Table 7. Rietveld-based cordierite i-ratios and AT texture coefficients were derived from Rietveld deconvoluted intensities and added to the table with label (Rietveld).

TABLE 7

| Ex. No. | Firing (° C./hr) | sampling for XRD | AT I(110)/ (I(020) + I(110)) | AT I(200)/ (I(020) + I(200)) | Cord I(100)/ (I(102) + I(100)) | Cord i-ratio (Rietveld) I(110)/ (I(110) + I(002)) | AT (Rietveld) I(002)/ (I(002) + I(200)) |
|---|---|---|---|---|---|---|---|
| 1 | QSL- 1357 C./16 h | powder | 0.63 | 0.25 | 0.72 | 0.66 | |
| 3 | QXM- 1357 C./16 h | powder | 0.65 | 0.24 | 0.72 | 0.66 | |
| 5 | QXO- 1357 C./16 h | powder | 0.58 | 0.21 | 0.70 | 0.66 | |
| 1 | QSL- 1356 C./16 h | Axial | 0.77 | | 0.64 | 0.52 | 0.46 |
| 2 | QXK- 1357 C./16 h | Axial | 0.74 | | 0.64 | 0.48 | 0.51 |
| 3 | QXM- 1357 C./16 h | Axial | 0.72 | | 0.68 | 0.51 | 0.49 |
| 4 | QXN- 1357 C./16 h | Axial | 0.76 | | (0.595 grog) | (0.66 grog) | 0.52 |
| 5 | QXO- 1357 C./16 h | Axial | 0.73 | | (0.69 grog) | (0.66 grog) | 0.507 |
| 6 | QXP- 1357 C./16 h | Axial | 0.80 | | 0.53 | 0.55 | 0.46 |
| 14 | RMJ- 1350 C./16 h | Axial | 0.825 | 0.54 | 0.54 | 0.47 | 0.57 |
| 15 | RMB- 1350 C./16 h | Axial | 0.78 | 0.525 | 0.41 | 0.45 | 0.44 |
| 16 | RMC- 1350 C./16 h | Axial | 0.795 | 0.59 | 0.48 | 0.57 | 0.50 |
| 17 | RMD- 1350 C./16 h | Axial | 0.785 | 0.525 | 0.41 | 0.48 | 0.43 |
| 18 | RME- 1350 C./16 h | Axial | 0.77 | 0.575 | 0.39 | 0.51 | 0.43 |
| 19 | RMF- 1350 C./16 h | Axial | 0.805 | 0.545 | 0.47 | 0.55 | 0.49 |
| 20 | RMG- 1350 C./16 h | Axial | 0.785 | 0.63 | 0.44 | 0.72 | 0.47 |
| 1 | QSL- 1356 C./16 h | Tangential surface | 0.54 | | 0.80 | 0.82 | 0.27 |
| 2 | QXK- 1357 C./16 h | Tangential surface | 0.56 | | 0.83 | 0.82 | 0.25 |
| 3 | QXM- 1357 C./16 h | Tangential surface | 0.605 | | 0.82 | 0.77 | 0.23 |

TABLE 7-continued

| Ex. No. | Firing (° C./hr) | sampling for XRD | AT I(110)/ (I(020) + I(110)) | AT I(200)/ (I(020) + I(200)) | Cord I(100)/ (I(102) + I(100)) | Cord i-ratio (Rietveld) I(110)/ (I(110) + I(002)) | AT (Rietveld) I(002)/ (I(002) + I(200)) |
|---|---|---|---|---|---|---|---|
| 4 | QXN-1357 C./16 h | Tangential surface | 0.63 | | 0.73 | (0.73 grog) | 0.3 |
| 5 | QXO-1357 C./16 h | Tangential surface | 0.64 | | 0.69 | (0.64 grog) | 0.29 |
| 6 | QXP-1357 C./16 h | Tangential surface | 0.57 | | 0.81 | 0.87 | 0.26 |
| 14 | RMJ-1350 C./16 h | Tangential surface | 0.58 | 0.2 | 0.8 | 0.83 | 0.23 |
| 15 | RMB-1350 C./16 h | Tangential surface | 0.61 | 0.25 | 0.82 | 0.85 | 0.27 |
| 16 | RMC-1350 C./16 h | Tangential surface | 0.58 | 0.24 | 0.75 | 0.84 | 0.23 |
| 17 | RMD-1350 C./16 h | Tangential surface | 0.61 | 0.22 | 0.81 | 0.83 | 0.24 |
| 18 | RME-1350 C./16 h | Tangential surface | 0.62 | 0.24 | 0.8 | 0.83 | 0.25 |
| 19 | RMF-1350 C./16 h | Tangential surface | 0.65 | 0.28 | 0.77 | 0.84 | 0.27 |
| 20 | RMG-1350 C./16 h | Tangential surface | 0.67 | 0.23 | 0.74 | 0.91 | 0.26 |
| 14 | RMJ-1350 C./16 h | Tangential polished | 0.58 | 0.21 | 0.81 | 0.82 | 0.22 |
| 15 | RMB-1350 C./16 h | Tangential polished | 0.69 | 0.26 | 0.8 | 0.80 | 0.28 |
| 16 | RMC-1350 C./16 h | Tangential polished | 0.61 | 0.26 | 0.76 | 0.80 | 0.26 |
| 17 | RMD-1350 C./16 h | Tangential polished | 0.67 | 0.26 | 0.8 | 0.84 | 0.26 |
| 18 | RME-1350 C./16 h | Tangential polished | 0.65 | 0.27 | 0.77 | 0.78 | 0.28 |
| 19 | RMF-1350 C./16 h | Tangential polished | 0.69 | 0.3 | 0.75 | 0.77 | 0.29 |
| 20 | RMG-1350 C./16 h | Tangential polished | 0.64 | 0.25 | 0.76 | 0.84 | 0.26 |

Compared to the reference material of Comparative Example 1, compositions of Examples prepared according to exemplary embodiments of the disclosure with higher cordierite/mullite phase fraction yield at the same firing conditions slightly higher porosity and mean pore size, which results in an improved material permeability by about 200 mDarcy. Higher porosity and mean pore size compared to the reference material provide: either a significant pressure drop advantage compared to the reference material can be reached at the same pore former level or the same targeted material porosity can be made with a lower pore former level.

The CTE of cordierite/mullite-rich materials prepared according to exemplary embodiments of the disclosure also shows an advantage compared to reference material Comparative Example 1. The higher the cordierite/mullite ratio, the lower is the CTE. For example, an advantage of 2 points in CTE is gained with use of Example 3 instead of Comparative Example 1. Typically, an advantage in CTE is coupled to a disadvantage in the material's mechanical response. However, the MOR of Example 3 is in the same range as flexure strength of the reference material Comparative Example 1 and the elastic modulus is substantially lower, so that the materials with higher cordierite/mullite ratio exhibit a substantial increase in strain tolerance. Strain tolerance increases with the cordierite/mullite ratio; for the highest cordierite/mullite ratio (Example 6), a strain tolerance of 0.133% is reached compared to the reference strain tolerance of 0.106% for Comparative Example 1.

A marked improvement of properties was observed for higher cordierite/mullite phase ratio in CMAT compared to the reference material of Comparative Example 1. This finding breaks the coupling and trade-offs that are typically observed between CTE, strain tolerance and porosity and suggests an overall improvement of the filter operation window for the materials according to exemplary embodiments of the disclosure. While not being wish to be bound by any theory, the reason for the unusual behavior may be found in some microcrack toughening that occurs due to strong interactions of propagating microcracks with pseudo-brookite-cordierite interfaces, where cracks undergo crack branching into different cordierite crystallographic planes, crack narrowing or closure within cordierite and cause interface debonding.

It will be apparent to those skilled in the art that various modifications and variations can be made in the present exemplary embodiments without departing from the spirit or scope of the disclosure. Thus, it is intended that the present disclosure cover the modifications and variations of these exemplary embodiments provided they come within the scope of the appended claims and their equivalents.

What is claimed is:

1. A method of manufacturing a ceramic article, comprising:
providing an inorganic batch composition comprising a magnesia source, a silica source, an alumina source, a titania source, and at least one sintering aid;
mixing the inorganic batch composition together with one or more processing aids comprising at least one of a plasticizer, lubricant, binder, pore former, and solvent to form a ceramic precursor batch composition;

shaping the ceramic precursor batch composition into a green body; and firing the green body under conditions effective to convert the green body into a ceramic article comprising a pseudobrookite phase comprising alumina, magnesia, and titania, a second phase comprising cordierite, and a third phase comprising mullite, wherein the cordierite-to-mullite phase ratio is greater than or equal to 1.3 and less than or equal to 2.5.

2. The method of claim 1, wherein the cordierite-to-mullite phase ratio is greater than or equal to 1.8 and less than or equal to 2.2.

3. The method of claim 1, wherein the ceramic precursor batch composition is shaped by extrusion.

4. The method of claim 1, wherein the firing conditions effective to convert the green body into a ceramic article comprise heating the green body at a hold temperature in the range of 1250° C. to 1450° C. and maintaining the hold temperature for a hold time sufficient to convert the green body into the ceramic article.

5. A method of manufacturing a ceramic article, comprising:

providing an inorganic batch composition comprising a magnesia source, a silica source, an alumina source, a titania source, and at least one sintering aid;

mixing the inorganic batch composition together with one or more processing aids comprising at least one of a plasticizer, lubricant, binder, pore former, and solvent to form a ceramic precursor batch composition;

shaping the ceramic precursor batch composition into a green body; and firing the green body under conditions effective to convert the green body into a ceramic article comprising a pseudobrookite phase comprising alumina, magnesia, and titania, a second phase comprising cordierite, and a third phase comprising mullite, wherein the cordierite-to-mullite phase ratio is greater than or equal to 1.3 and less than or equal to 7.

6. A method of manufacturing a ceramic article, comprising:

providing an inorganic batch composition comprising a magnesia source, a silica source, an alumina source, a titania source, and at least one sintering aid;

mixing the inorganic batch composition together with one or more processing aids comprising at least one of a plasticizer, lubricant, binder, pore former, and solvent to form a ceramic precursor batch composition;

shaping the ceramic precursor batch composition into a green body; and firing the green body under conditions effective to convert the green body into a ceramic article comprising a pseudobrookite phase comprising alumina, magnesia, and titania, a second phase comprising cordierite, and a third phase comprising mullite, wherein the cordierite-to-mullite phase ratio is greater than or equal to 1.3 and less than or equal to 4.

* * * * *